(12) United States Patent
French

(10) Patent No.: US 9,162,775 B2
(45) Date of Patent: Oct. 20, 2015

(54) VENTING GAS FROM A TANK

(75) Inventor: Clive French, Nottingham (GB)

(73) Assignee: Airbus Operations Limited, Bristol (GB)

( * ) Notice: Subject to any disclaimer, the term of this patent is extended or adjusted under 35 U.S.C. 154(b) by 1112 days.

(21) Appl. No.: 13/137,143

(22) Filed: Jul. 22, 2011

(65) Prior Publication Data

US 2012/0025026 A1 Feb. 2, 2012

(30) Foreign Application Priority Data

Jul. 29, 2010 (GB) .................................. 1012723.1

(51) Int. Cl.
*B64F 1/28* (2006.01)
*B64D 37/00* (2006.01)

(52) U.S. Cl.
CPC ................ *B64F 1/28* (2013.01); *B64D 37/005* (2013.01); *Y10T 137/0318* (2015.04)

(58) Field of Classification Search
CPC ........ B64F 1/28; B64D 37/005; B64D 37/16; B64D 37/02; B64D 37/06; B65B 3/04; B65D 90/34; F15D 1/00
USPC .............. 137/205, 487, 488, 587, 899.2, 907; 251/149.6, 61.1, 63; 141/7, 52, 53, 59; 244/135 R, 135 A
See application file for complete search history.

(56) References Cited

U.S. PATENT DOCUMENTS

| | | | | |
|---|---|---|---|---|
| 2,965,196 A | * | 12/1960 | Rich, Jr. ........................... | 141/11 |
| 3,518,977 A | * | 7/1970 | Smith ........................ | 251/61.1 |
| 3,977,423 A | * | 8/1976 | Clayton ......................... | 137/487 |
| 4,762,156 A | * | 8/1988 | Rich ................................ | 141/59 |
| 5,117,876 A | * | 6/1992 | Kuntz ................................. | 141/7 |
| 5,181,497 A | | 1/1993 | Matsushita et al. | |
| 5,575,441 A | | 11/1996 | Gervais et al. | |
| 5,584,278 A | * | 12/1996 | Satoh et al. .................... | 137/587 |
| 6,003,539 A | | 12/1999 | Yoshihara | |
| 6,810,922 B1 | * | 11/2004 | Grantham ....................... | 141/59 |
| 7,325,577 B2 | * | 2/2008 | Devall ............................. | 141/59 |
| 7,665,479 B2 | * | 2/2010 | Cutler et al. ............... | 244/135 A |
| 2006/0213561 A1 | * | 9/2006 | Tiwet ............................ | 137/488 |
| 2011/0042520 A1 | * | 2/2011 | Glaser et al. .............. | 244/135 A |

FOREIGN PATENT DOCUMENTS

| | | |
|---|---|---|
| EP | 0568005 | 11/1993 |
| GB | 2321639 | 8/1998 |
| WO | WO 2006/064493 | 6/2006 |
| WO | WO 2007/057629 | 5/2007 |
| WO | WO 2007/138366 | 12/2007 |
| WO | WO 2009098012 A2 * | 8/2009 |

* cited by examiner

*Primary Examiner* — Craig Schneider
*Assistant Examiner* — Joseph P Heil
(74) *Attorney, Agent, or Firm* — Nixon & Vanderhye P.C.

(57) ABSTRACT

The present invention provides a tank vent device for venting gas from a tank 10 comprising a gas inlet 107 for receiving gas from a vent outlet of the tank, a gas outlet 109 for discharging the gas received, and a pressure valve 70 connecting the gas inlet and gas outlet, wherein the pressure valve is connected to a control pressure input 108 and is controllable by control pressure supplied at the control pressure input, whereby, in use, the pressure valve is controlled by the control pressure to open and close so as to regulate the flow of gas between the gas inlet and the gas outlet. The present invention also provides a vent tank 10, methods of venting gas and refueling an aircraft.

33 Claims, 18 Drawing Sheets

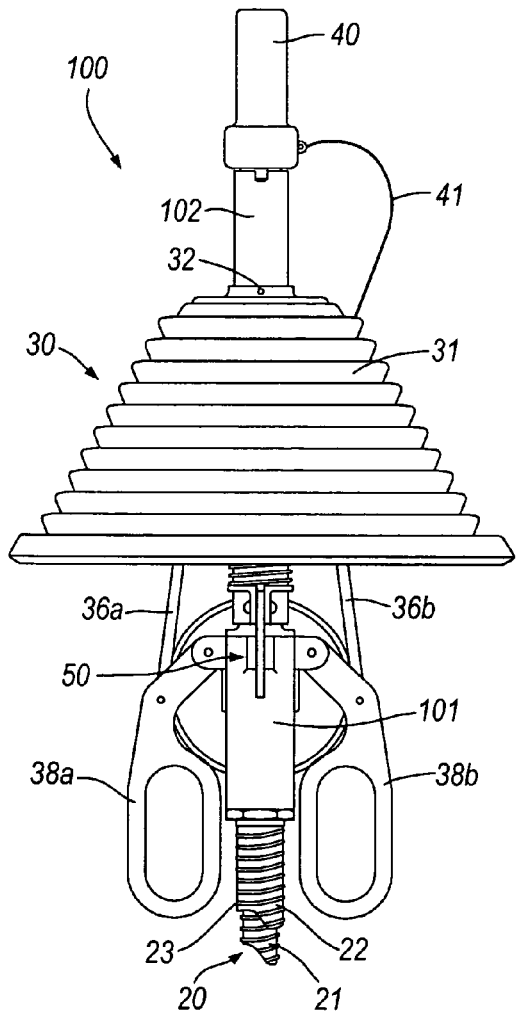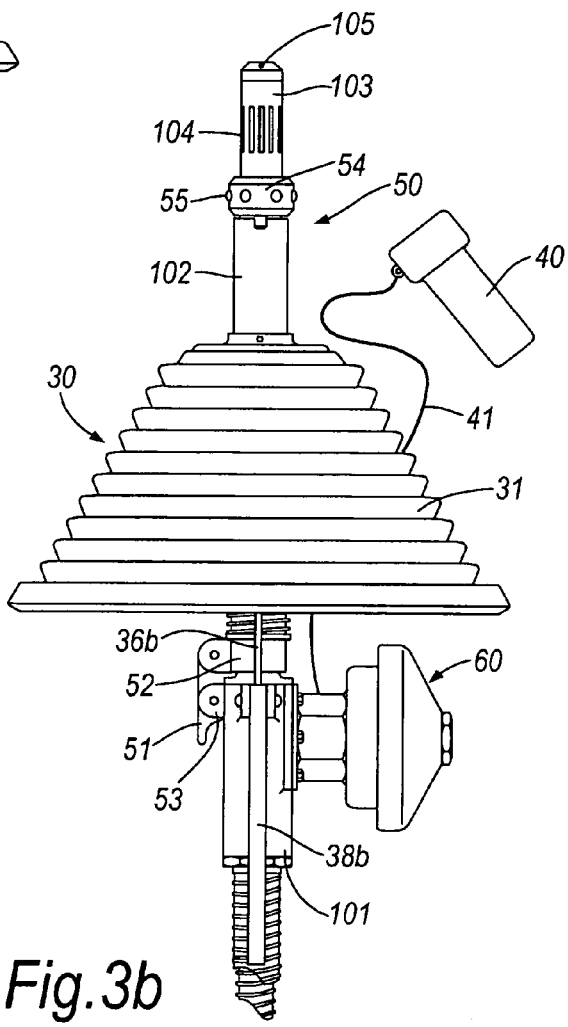
Fig.3a
Fig.3b

VENTING GAS FROM A TANK

BACKGROUND OF THE INVENTION

The present invention concerns the venting of gas from fuel tanks. In particular, it concerns venting fuel tanks of aircraft. Also particularly, but not exclusively, this invention concerns a tank vent device for venting gas from a tank. The invention also concerns a vent tank, a method of venting gas from a tank and a method of refuelling an aircraft including performing the method of venting gas.

It is important to vent a tank for two reasons. Firstly, a tank must be vented to enable the tank to be efficiently filled with fuel. If there is inadequate venting, the pressure build up in the tank is significant and can make it very difficult to put further fuel in the tank. Secondly, a pressure build up can result in a large positive pressure differential between the tank and the atmosphere. A negative pressure differential could also arise (depending on the atmospheric pressure). Any pressure differential puts undue strain on the tanks and can cause damage to them and their surrounding structure. This is especially important in relation to aircraft fuel tanks, as the fuel tanks are often located in the wings or tail and it is important to minimise and, preferably, entirely prevent, wing/tail damage.

Venting of aircraft tanks is normally performed by allowing gas to vent from the fuel tanks via a passive vent. The gas can be vented directly from the fuel tank itself or via a dedicated vent tank.

GB 2 321 639 A discloses a fuel vapour recovery system for an automotive vehicle. The system includes first and second vapour recovery canisters and a bypass flow element between the canisters. When the bypass flow element is open, vapour can pass directly through the bypass element to the second canister without first passing through the first canister. When the bypass flow element is closed, vapour must first pass through the first canister before reaching the second canister. The bypass flow element is opened when the pressure differential across the element is large enough to push a check valve open.

The vapour recovery system of GB 2 321 639 A can effectively contain the fuel vapour, that would otherwise be vented into the atmosphere as VOCs (volatile organic compounds) and cause air pollution. The fuel vapour can also be reused/recycled.

However, use of the vapour fuel recovery system of GB 2 321 639 A results in a vapour flow restriction (even when the bypass flow element is open). Therefore, the system causes pressure to build up in the fuel tank during refuel and therefore slows down the refuelling rate that can be achieved and puts undue strain on the tank. The system is also not suitable for use with jet fuel or for use on an aircraft.

U.S. Pat. No. 5,575,441 discloses a device for preventing fuel spillage and the venting of fuel vapour to the atmosphere. The device is attached to the outlet of a dump mast on a wing of a military aircraft during refuel. An adaptor assembly of the system is attached on one side to the outlet by a groove corresponding to the shape of the outlet walls. A standard fuel hose is attached to the opposite side of the adaptor assembly and feeds into a fuel container of a fuel truck. Suction is applied to the fuel hose in order to urge fuel and vapour out of the dump mast into the fuel container. However, the system disclosed contains no safety features that could prevent over or under pressure of the fuel tank or prevent the possibility of flame propagation via the fuel hose into the fuel tank. The system, however, does contain an alarm which can be used to show fuel flow problems or hose kinking. The alarm is controlled by sensors. Hence, electronics are used to control and provide warnings in relation to the vent system. This means that electrical power would be in close proximity to highly volatile fuel vapour, directly linked to the fuel tank. Failure of the safety system by an electrical short would give rise to a risk of fuel vapour ignition.

WO 2007/138366 discloses the use of a standard coupling (known as the API 1004 coupling) connected to an aircraft vent during refuel of the aircraft tanks. The coupling is connected back to a fuel tanker via a discharge line. The tanker collects the vapour and later transports it to a gas storage terminal. The gas can then be used for electricity production and supply. The coupling includes an "overpressure vent valve" which prevents the aircraft tank becoming overpressured by opening when the pressure in the aircraft tank increases too much. This coupling system is controlled solely based on the pressure in the aircraft tank. In other words, gas is extracted into the discharge line when the valve is open but not when it is closed. There is no independent control of the system. Furthermore, the system disclosed contains no safety features that could prevent the possibility of flame propagation via the discharge line into the aircraft tank.

The present invention seeks to mitigate the above-mentioned problems. Alternatively or additionally, the present invention seeks to provide an improved tank vent device, vent tank and method of venting gas from a tank.

SUMMARY OF THE INVENTION

The present invention provides, according to a first aspect, a tank vent device for venting gas from a tank, the device comprising a gas inlet for receiving gas from a vent outlet of the tank, a gas outlet for discharging the gas received from the vent outlet of the tank, and a pressure valve connecting the gas inlet and gas outlet, wherein the pressure valve is connected to a control pressure input and is controllable by control pressure supplied at the control pressure input, whereby, in use, the pressure valve is controlled by the control pressure to open and close so as to regulate the flow of gas between the gas inlet and the gas outlet.

Providing a pressure valve that can be controlled by a separate control pressure means that the pressure valve can be opened and closed depending on a separate control. The opening and closing of the pressure valve is not simply dependent on the pressure differential of the gas inlet and gas outlet. This means the pressure valve can be opened and closed in dependence on different or additional conditions.

In general, the tank will be at a pressure greater than atmospheric pressure due to the increase in pressure from refuelling the tank. Preferably, the gas outlet is arranged to be connected to a low pressure gas supply. Providing a low pressure gas supply means that the tank pressure can be lowered so as to reduce a positive pressure differential between the tank and the atmosphere. In addition, providing a low pressure gas supply means that the tank pressure can be lowered to a pressure below that of ambient pressure. The tank pressure should not be lowered to a pressure to give an undesirably large negative pressure differential between the tank and the atmosphere.

Preferably, the gas pressure at the control pressure input of the pressure valve is provided by the same source that provides the gas pressure in the gas outlet. This makes the tank vent device simpler.

Preferably, the gas inlet and gas outlet both act on a first side of a moveable diaphragm of the pressure valve and wherein the control pressure input acts on a second, opposite side of the diaphragm. The moveable diaphragm preferably acts to seal the gas inlet and gas outlet from each other. More preferably, the diaphragm of the first pressure valve is arranged to be moved away from the gas inlet and gas outlet by low pressure supplied at the control pressure inlet.

More preferably, the cross-sectional area of the gas inlet and the cross-sectional area of the gas outlet acting on the diaphragm of the first pressure valve are dimensioned such that, in use, when the gas inlet experiences a higher than atmospheric pressure from the vent tank and the gas outlet experiences a lower than atmospheric pressure from a low pressure supply, there is little overall combined pressure force acting on the diaphragm from the combination of the gas inlet and gas outlet. This means that the pressures experienced in the gas inlet and gas outlet have a negligible effect on the pressure valve. This allows the first pressure valve to be controlled essentially solely based on the pressure force supplied by the control pressure.

Preferably, movement of the diaphragm away from the gas inlet and gas outlet causes the first pressure valve to open and thereby allow the gas inlet to be connected with the gas outlet such that gas in the gas inlet can flow to the gas outlet. This allows gas from the vent tank to be vented through the first pressure valve and through the vent tank device. The gas can then be collected for later recycling or re-use or can simply be collected to prevent it escaping into the atmosphere and causing air pollution.

Preferably, the device further comprises a second pressure valve for controlling the pressure force supplied to the first pressure valve by the control pressure. This allows the first pressure valve to be controlled by the second pressure valve. More preferably, the second pressure valve controls the pressure force supplied to the first pressure valve by controlling the area over which the control pressure is supplied to the first pressure valve. This means that the control pressure supplied to the tank vent device can be at a constant pressure, whilst still allowing it to supply a range of forces on the first pressure valve. It also allows the first pressure valve to be controlled without the use of electronics.

Preferably, the second pressure valve is controllable based on a pressure differential between two pressure inputs including a first pressure input corresponding to the pressure in the tank being vented. This allows the second pressure valve to be controlled based on the tank pressure. This, in turn, allows the tank pressure to control opening and closing of the first pressure valve. This means that gas flow from the tank (the gas inlet) can be controlled (and therefore the venting of the tank to be controlled) based on the pressure in the tank. More preferably, the gas at the first pressure input of the second pressure valve comes from the same source as the gas in the gas inlet. This means a separate inlet from the tank is not needed.

Preferably, a second pressure input to the second pressure valve corresponds to a base pressure. More preferably, the base pressure corresponds to a "target" tank pressure. Preferably, the base pressure corresponds to atmospheric pressure. This allows the first pressure valve to be controlled (and therefore the venting of the tank to be controlled) based on the pressure differential between the tank and the atmosphere (or another base pressure). It also allows the tank to be vented such that the pressure in the tank approaches a "target" pressure, which could be atmospheric pressure. This means that the overall force and strain exerted on the tank can be reduced.

Preferably, the second pressure valve comprises a moveable diaphragm, with the first pressure input on one side of the diaphragm and a second pressure input on the second, opposite side of the diaphragm.

More preferably, the diaphragm of the second pressure valve is connected to a piston, such that when the diaphragm moves in a first direction towards the second pressure input side, the piston is caused to move in the same direction from a closed position against a first seat to an open position. When in the closed position, the piston may seal off the control pressure input from the first pressure valve. More preferably, the first seat is on the second, opposite side of the first pressure valve, such that lifting of the piston from the first seat opens the control pressure input of the first pressure valve, enabling a pressure force to be supplied to the first pressure valve by the control pressure. Even more preferably, when the piston is in the fully open position, it rests against a second seat, in between the first seat and the second pressure valve.

Preferably, the diaphragm of the second pressure valve is also connected to a second piston, such that when the diaphragm moves in a second direction towards the first pressure input side, the second piston is caused to move in the second direction towards a restricting position with respect to the control pressure input of the first pressure valve. More preferably, once the second piston is in its restricting position, further movement of the diaphragm in the second direction causes the first piston to move in the second direction towards its closed position against the first seat to seal off the control pressure input of the first pressure valve.

Preferably, in use, the control pressure is supplied in between the first seat and second seat such that the control pressure can be supplied to the diaphragm of the first pressure valve through an opening associated with the first seat.

Preferably, the control pressure is supplied between the second seat and the second pressure valve such that the control pressure can be used to hold the first piston against the second seat.

Preferably, the device is arranged to receive a coaxial pipeline such that the gas outlet can be connected to an inner section of the coaxial pipeline and that the control pressure can be supplied in an outer section of the coaxial pipeline, such that, in use, when the outer section of the coaxial pipeline is cut or severed, atmospheric pressure is supplied as the control pressure, causing the first pressure valve to close. This means that if there is a fire or if the pipeline gets damaged in another way, the outer section is ruptured first. This means that atmospheric pressure is supplied as the control pressure, thereby increasing the pressure force supplied to the first pressure valve, thereby closing the first pressure valve. Hence, the first pressure valve is closed and prevents flow of gas between the gas inlet and gas outlet as soon as the pipeline is damaged. Therefore, upon further damage of the pipeline (i.e. rupture of the inner section), the gas from the atmosphere cannot flow past the first pressure valve and cannot reach the gas inlet or vent tank through the vent tank device. This is an important feature because it means that in the event of a fire (or other damage to the pipeline), the vent tank device automatically shuts down and does not allow the device to be used as a bypass to a flame arrestor associated with the vent tank. Hence, any fire occurring outside the vent tank is prevented from reaching the vent tank through the vent tank device. Providing this safety feature with a single pipeline means that handling and storage of the ground refuelling equipment is easier and less awkward.

More preferably, the device is arranged to receive a low pressure gas supply in the inner section of the coaxial pipeline and thereby supply a low pressure gas to the gas outlet. Even more preferably, the device is arranged such that the low pressure gas supply can also be supplied to the outer section of the coaxial pipeline, such that the low pressure gas supply to the gas outlet is the same gas supply as the control pressure supply to the control pressure input.

Preferably, the device further comprises a probe for connecting to a vent tank, the probe comprising a nozzle connected to the gas inlet such that gas can be vented from the tank, through the nozzle to the gas inlet. This allows the device to be directly inserted into a valve in the vent tank. Preferably, the probe further comprises a locking mechanism for securing the probe to the tank during use.

Preferably, a shroud is mounted on the probe, such that, in use, the shroud provides a seal around the probe. This prevents any gas, for example, gas from a flame arrestor passage, that is not sealed between the vent tank and the tank vent device from escaping. More preferably, the shroud is provided with a bleed port so that gas, and in the case of a system failure; fuel, contained by the shroud can be captured by the bleed port and transferred into the gas inlet.

Preferably, the shroud can be moved between a deployed position, wherein, in use, the shroud provides a seal around the probe, and a collapsed position, such that the device can be stored. Even more preferably, the shroud comprises a lever mechanism, such that, when in the deployed position, the levers are over-centred so as to help maintain the shroud in the deployed position.

According to a second aspect of the invention there is also provided a tank vent assembly comprising the tank vent device as described above, and a coaxial pipeline connected to the gas outlet of the tank vent device for connection to a low pressure and control pressure supply. The inner section of the coaxial pipeline may be connected to the gas outlet and the outer section of the coaxial pipeline may be connected to the control pressure input.

According to a third aspect of the invention there is also provided a vent tank comprising a valve assembly for connecting to the vent tank device as described above, the valve assembly comprising a valve such that when the probe is inserted in the valve assembly, the valve can be opened to allow gas in the vent tank to vent into the probe, and a securing mechanism for releasably securing the probe to the vent tank. Preferably, the valve assembly further comprises a rotatable joint to allow the probe to move rotationally in relation to the tank. Providing a rotatable joint means that no loading is imported into the wing structure from the probe. This allows the structural weight of the vent tank to be minimized whilst still being able to use a relatively long probe. A long probe aids installation in the valve assembly.

According to a fourth aspect of the invention there is also provided an aircraft wing comprising the vent tank as described above.

According to a fifth aspect of the invention there is also provided an aircraft comprising the vent tank as described above or the wing as described above.

According to a sixth aspect of the invention there is also provided a method of venting gas from a tank, wherein the method includes the steps of providing a tank vent device as described above or the tank vent assembly as described above, connecting the device or assembly to a vent tank as described above, and venting gas from the vent tank through the gas inlet and gas outlet of the device/assembly.

According to a seventh aspect of the invention there is also provided a method of venting gas from a tank, the method including the steps of providing a pressure valve to control the venting of gas from the tank, and providing an independent control pressure to control opening and closing of the pressure valve. Preferably, the control pressure is lower than the pressure of the tank. Preferably, the method includes the step of changing the area over which the control pressure is supplied to the pressure valve so as to vary the pressure force on the pressure valve. More preferably, the area is changed based on a pressure differential between the pressure of the tank and a base pressure. Preferably, the method includes the step of providing a low pressure supply to an output of the pressure valve.

According to an eighth aspect of the invention there is also provided a method of refuelling an aircraft, including performing the method of venting gas from a tank on the aircraft as described above and simultaneously supplying liquid fuel to a fuel tank on the aircraft.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 3a shows a rear view of a tank vent assembly according to an embodiment of an aspect of the invention;

FIG. 3b shows a side view of the tank vent assembly of FIG. 3a;

FIG. 8 shows a cross section through Section A-A shown in FIG. 7a;

DETAILED DESCRIPTION

Figure 1:
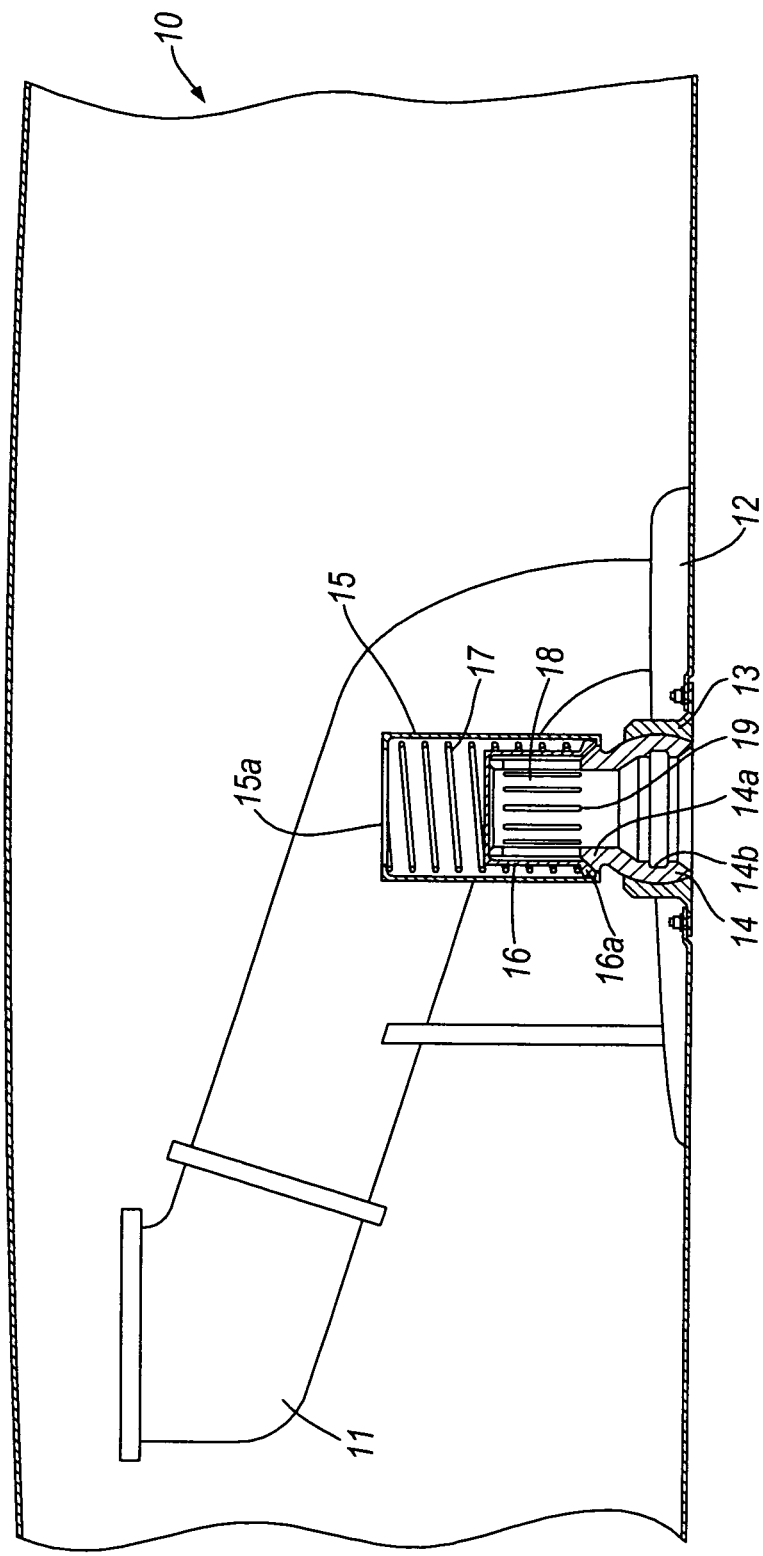
FIG. 1 shows a partial side view of a vent tank, according to an embodiment of an aspect of the invention.
Figure 2:
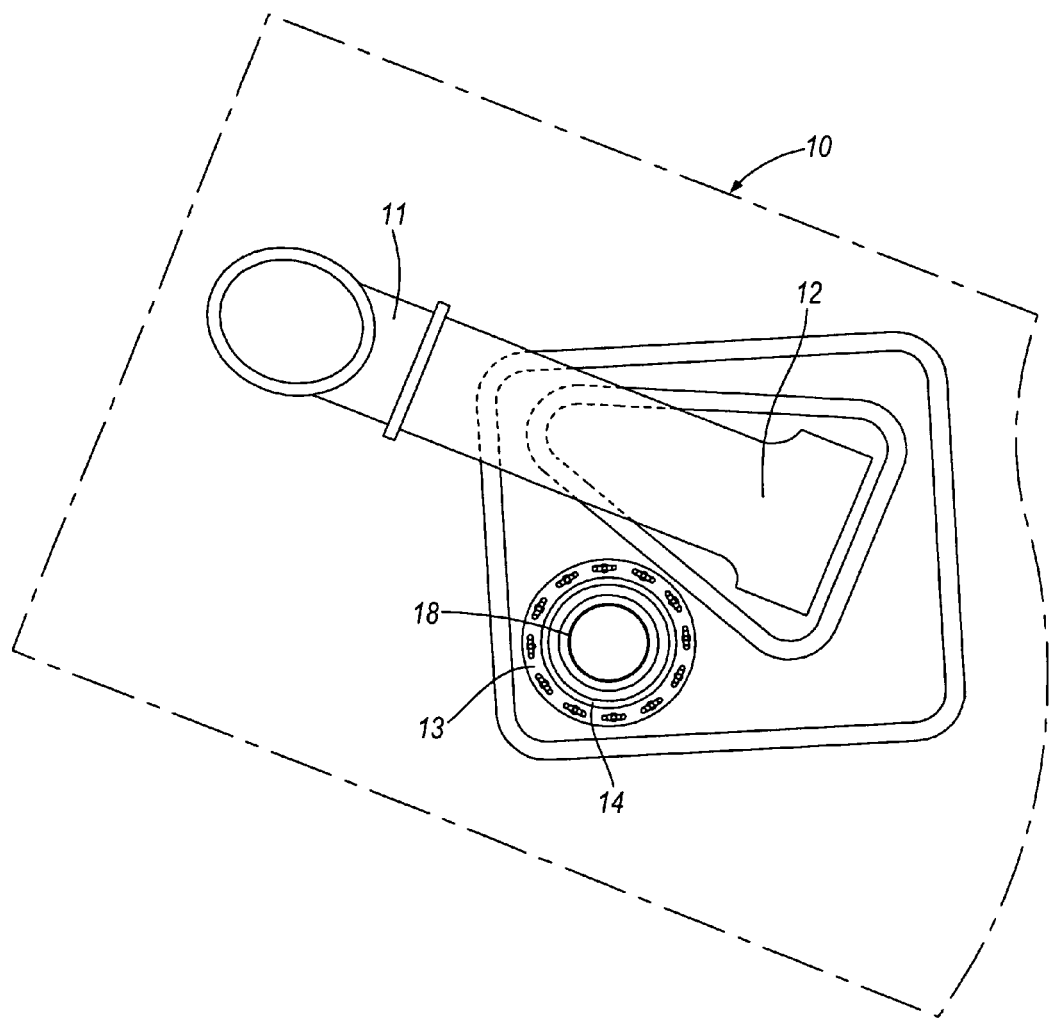
FIG. 2 shows a plan view of the flame arrestor and valve assembly from inside the vent tank of FIG. 1.

FIGS. 1 and 2 show partial views of a vent tank 10 in the outboard wing of an aircraft. The vent tank 10 conventionally includes a flame arrestor 11 and a NACA (National Advisory Committee for Aeronautics) duct 12. The vent tank 10 also includes a valve assembly situated within the NACA duct 12. The valve assembly includes a socket 13 which is bolted into place within the NACA duct.

A ball portion 14 of the valve assembly is contained within the socket 13 to provide a rotatable gimble joint of the valve assembly to the vent tank 10. The ball portion 14 has a bore including an internal circular groove 14b. At the top of the ball portion is a slanted valve seat 14a. A valve casing 15 is mounted above the ball portion 14 and includes an upper opening 15a to the inside of the vent tank 10.

Within the valve casing 15 is a moveable cap 16. The cap 16 includes a slanted valve seat 16a at the bottom. This valve seat 16a corresponds to the slanted valve seat 14a of the ball portion 14 such that the moveable cap 16 can rest closed on the ball portion 14. The moveable cap 16 is mounted on the outside of an inner valve frame 18. The inner valve frame 18 contains gas inlet slots 19.

A spring 17 in the valve casing between a top inner surface of the casing and an upper portion of the moveable cap valve seat 16a. Hence, the spring 17 acts to keep the moveable cap closed against the ball portion 14.

FIGS. 3a to 3e show different views of a tank vent assembly according to an embodiment of the present invention. The tank vent assembly is designed to fit in the valve assembly in the vent tank 10, as described above.

The tank vent assembly includes a probe 100 with a lower (gas outlet) section 101, a middle section 102 and an upper (gas inlet) section 103.

At the upper section 103, there are gas inlet slits 104 around the probe circumference. The gas inlet slits 104 extend into the inner hollow of the probe 100 which forms a gas inlet channel 107. There is also a gas inlet bleed opening 105 at the top of the probe 100. The gas inlet bleed opening 105 leads to a gas inlet bleed channel 106 extending down the probe.

Figure 6A:
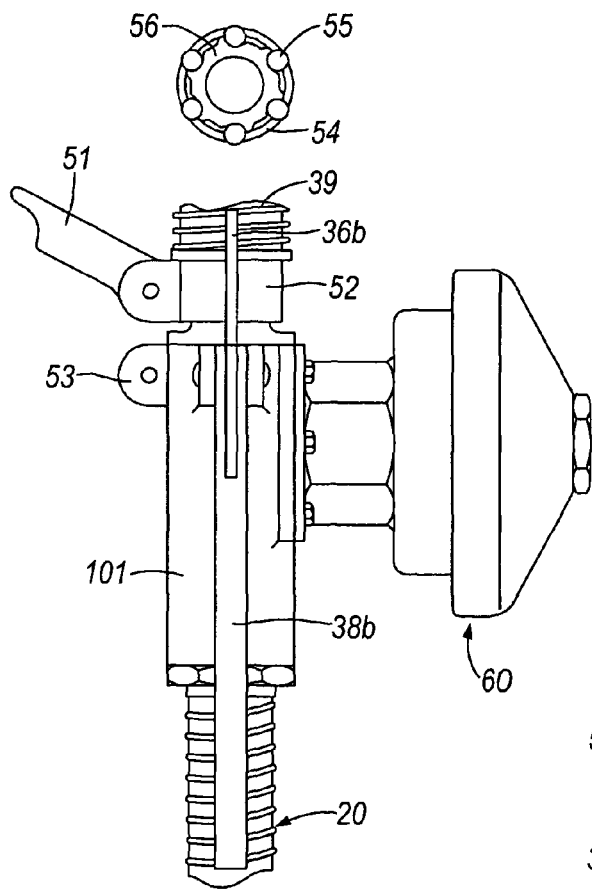
FIG. 6a shows a side view of part of the tank vent assembly of FIGS. 3a to 3e and 5.
Figure 6B:
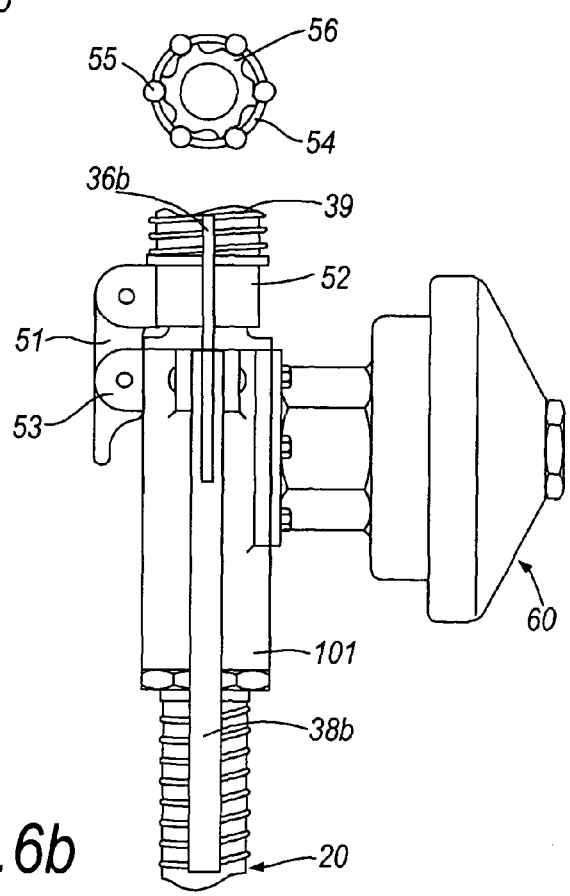
FIG. 6b shows a side view of part of the tank vent assembly of FIGS. 3a to 3e and 5.

Below the gas inlet slits 104 is an upper part of a ball rack lock mechanism 50. A ball race outer collar 54 has six rotatably mounted ball bearings 55 in its circumference. (There should, ideally, be at least three ball bearings.) The collar 54 and ball bearings 55 can be rotated with respect to an inner shaped collar 56. In a locked position (as shown in FIG. 6a), the ball bearings 55 rest in grooves of the inner collar 56. In a locked position (shown in FIG. 6b), the ball bearings rest in mini grooves on the top of spokes of the inner collar 56. Hence, in the unlocked position, the ball bearings 55 are nearer the centre and in the locked position, the ball bearings 55 are further outwards.

The outer collar 54 is connected to and can be rotated by a lever collar 52 at the lower section 101 of the probe 100. The lever collar 52 is connected to a lever 51. The lever 51 can be pivoted from a position flush with the probe and held in a lever slot 53 to an extended position where it can be rotated with respect to the probe 100 to rotate the lever collar 52 and outer collar 54.

When in the locked position, the ball bearings 55 are forced outwards to co-operate with the circular groove 14b in the ball portion 14 of the valve assembly. Hence, the probe 100 is locked in the valve assembly by rotation of the lever 51 and lever collar 52. The probe 100 can be released by rotation of the lever 51 in the opposite direction.

The tank vent assembly also has an umbrella shroud 30 having a shroud covering 31 mounted on the middle section 102 of the probe 100. The shroud covering is shown in a collapsed position in FIGS. 3a to 3c and in a deployed position in FIG. 3d. A narrow part of the shroud covering 31 is attached to a shroud connector 33 fixedly mounted on the probe 100. The shroud connector 33 contains a bleed port 32 connected to the gas inlet channel 107. Eight shroud arms 34a, 34b and six others (not shown) are pivotally mounted around the outer circumference of the shroud connector 33. The other ends of the shroud arms are connected around the circumference of the widest part of the shroud covering 31.

Connecting levers 35a, 35b and six others (not shown) are pivotally connected to the shroud arms 34a, 34b etc. approximately one third of the length of the shroud arms from the connector 33. The other ends of the connecting levers 35a, 35b etc. are connected to the outer circumference of a handle lever slider 37, slidably mounted on the probe 100 below the shroud connector 33. Also pivotally connected at two points on the handle lever slider 37 are the upper ends of two handle levers 36a, 36b. These handle levers 36a, 36b are pivotally connected at their lower ends to two handles 38a, 38b and the two handles 38a, 38b are pivotally connected to the probe 100.

Figures 3C, 3D:
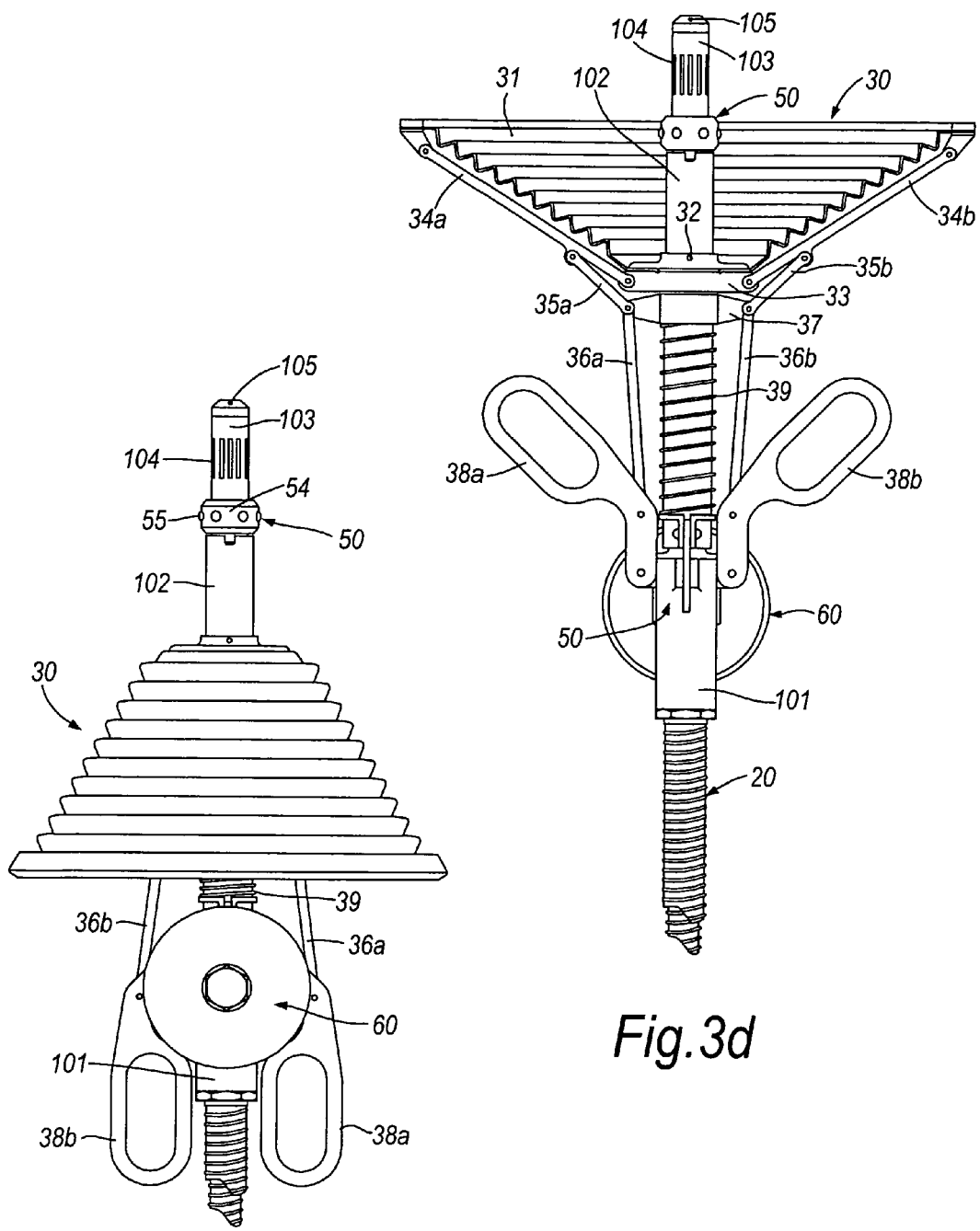
FIG. 3c shows a front view of the tank vent assembly of FIGS. 3a and 3b.
FIG. 3d shows a rear view of the tank vent assembly of FIGS. 3a to 3c.
Figure 3E:
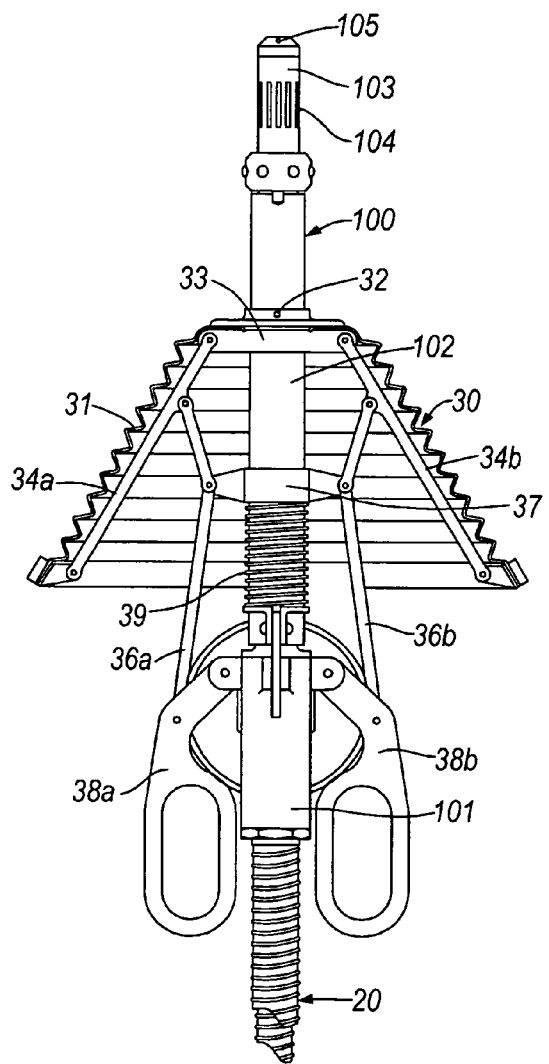
FIG. 3e shows a rear section view of the tank vent assembly of FIGS. 3a to 3d.

A shroud spring 39 is positioned around the probe underneath the handle lever slider 37 so as to bias the slider 37 upwards (as in FIG. 3d).

A cap 40 is shown in FIG. 3a placed on the top of the probe 100. The cap 40 is connected by a lanyard 41 to the outside of a valve meter assembly 60 (described later).

Figure 4:
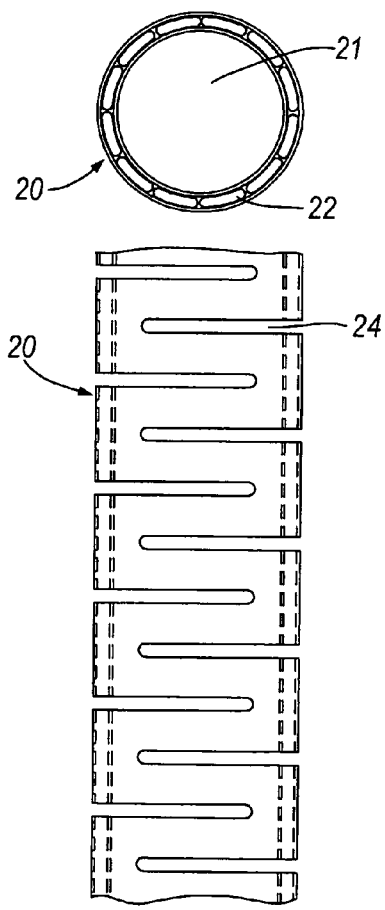
FIG. 4 shows two sections through at least part of the coaxial pipeline of the tank vent assembly of FIGS. 3a to 3e.

A coaxial pipeline 20 is connected to the bottom of the probe 100. The pipeline 20 has an inner tube 21 and an outer tube 22. As shown in the lower figure of FIG. 4, the pipeline 20 also has re-inforcement indents 24, allowing the pipeline to flex without causing damage to the pipeline 20.

Figure 5:
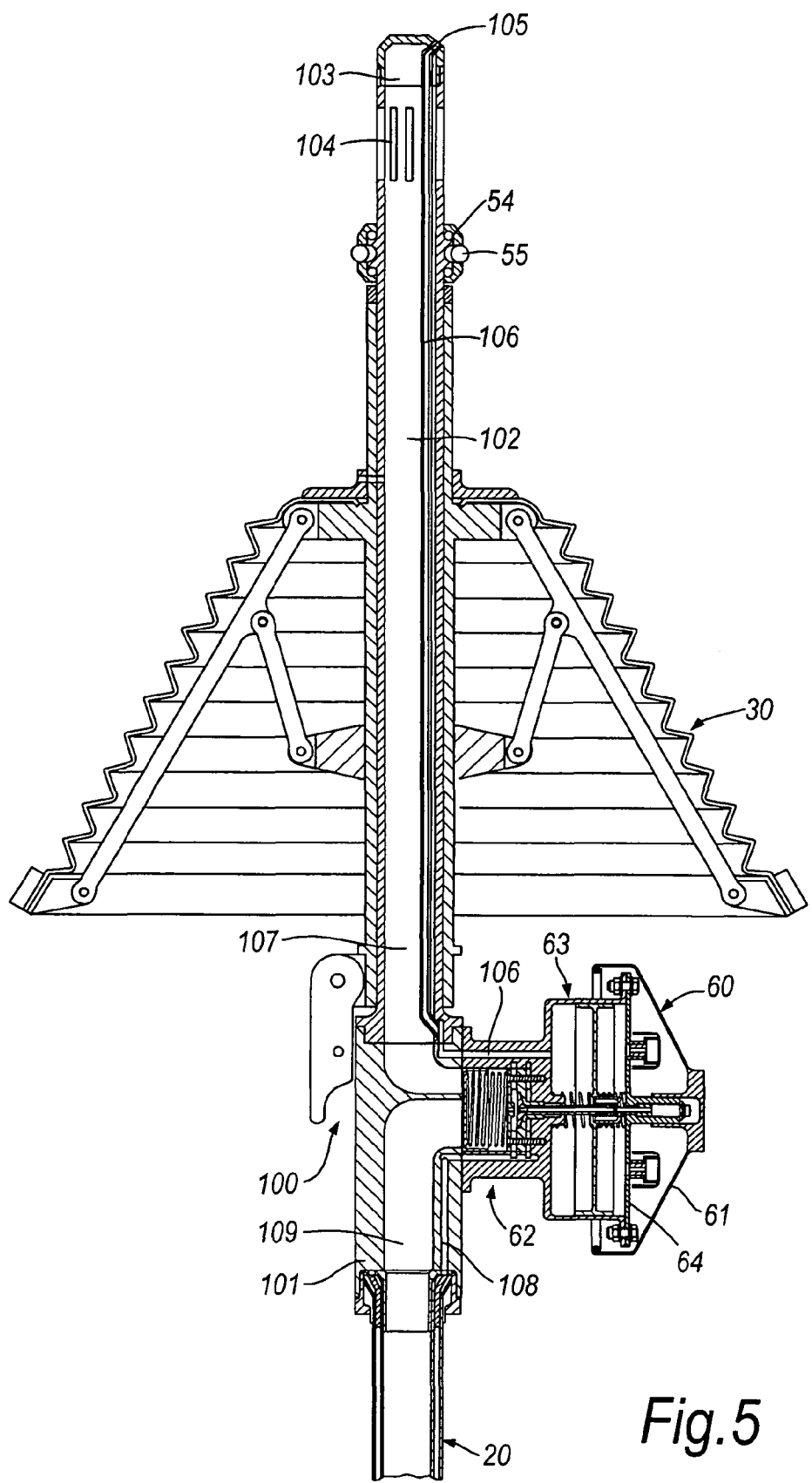
FIG. 5 shows a side section view of the tank vent assembly of FIGS. 3a to 3e.

As shown in FIG. 5, in the lower section 101 of the probe 100 is a gas outlet channel 109 and a control pressure input channel 108. The coaxial pipeline 20 is attached to the lower section of the probe 100 so that the inner tube 21 is connected to the gas outlet channel 109 and the outer tube 22 is connected to the control pressure input channel 108.

As also shown in FIG. 5, a meter valve assembly 60 is mounted on the lower section 101 of the probe 100. The meter valve assembly 60 has a shaft section 62 connected to the lower section 101 of the probe 100 and a pressure chamber section 63 connected to the shaft section 62. A plate 64 is mounted to the other side of the pressure chamber section 63. Two gas ports 65 are located on the exterior side of the plate 64. The gas ports 65 allow air at atmospheric pressure into the pressure chamber section 63. A cover 61 is mounted over the plate 64 and the gas ports 65. The cover 61 acts to protect the gas ports 65 and the meter valve assembly 60 but also allows air to reach the gas ports 65.

The meter valve assembly 60 is shown in more detail in FIGS. 7a to 7f.

A first pressure valve 70 is located in the shaft section of the meter valve assembly 60. The first pressure valve 70 has a non-flexible diaphragm 71 slidably moveable in a chamber 72 formed in the shaft section 62. A spring 73 is also contained in the chamber 72 between the rear of the diaphragm 71 and a disc 74 at the rear of the chamber 72. Hence, the diaphragm 71 is biased away from the disc 74. In its farthest position from the disc 74, the diaphragm 71 is in its closed position abutting against a dividing wall between the gas inlet channel 107 and gas outlet channel 109.

The disc 74 has an opening 75 in the centre and a raised area around the reverse of the opening. The raised area forms a valve seat 74a.

The control pressure input channel 108 leads to a control pressure inlet 76 on the reverse side of the disc 74.

A second disc 78 is located behind the first disc 74. The control pressure input channel 108 also leads to a second control pressure inlet 77 in between the first disc 74 and the second disc 78. The second disc 78 has a slanted annular ring opening 79. The slant of the opening provides a valve seat on the front side of the second disc 78.

A second pressure valve 80 is located in the pressure chamber section 63 of the meter valve assembly 60. The second pressure valve 80 has a non-flexible diaphragm 82 slidably moveable in a chamber 81 formed in the pressure chamber section 63. Two springs 83a and 83b are also contained in the chamber 81; one 83a between the front of the chamber 81 and the front of the diaphragm 82 and one 83b between the rear of the diaphragm 82 and the rear of the chamber 81. The diaphragm 82 has a box structure 84 at its centre. The box structure 84 is connected to the spring 83 so as to bias the diaphragm 82 to a central, default position along the chamber 81.

The gas ports 65 on the rear wall 64 of the pressure chamber 81 provide atmospheric pressure to the rear side of the diaphragm 82. The gas inlet bleed channel 106 leads to the front side of the diaphragm 82.

A piston assembly 90 is associated with the box structure 84. A first piston 92 of the piston assembly 90 is slidably mounted with respect to the box structure 84. The first piston 92 has a protruding stop portion 92a at its rear end, which is contained within the box structure 84 such that the first piston 92 cannot completely slide out of the box 84. The first piston 92 extends out of the box 84 through an opening at the front of the box. The first piston 92 has a first piston head 93 at its front end. The first piston 92 also has a spring holding protrusion 92b in between the piston head 93 and protruding stop portion 92a. A spring 94 is held between the spring holding protrusion 92b and the front wall of the pressure chamber 81 such as to bias the first piston 92 away from the chamber 81 into an extended position.

A second piston 95 is slidably mounted within a hole through the centre of the first piston 92. The second piston 95 has a needle head at its front end. The second piston 95 has a stop 95a on a section of the second piston 95 that extends out of the rear of first piston 92. The stop 95a is contained within the box structure 84 such that the second piston 95 cannot completely slide out of the box 84. A spring 96 is contained within the box 84 between the stop 92a of the first piston 92 and the stop 95a of the second piston 95. A rear end of the second piston 95 extends out the back of the box 84 and through the plate 64 at the rear of the pressure chamber 81. In line with the second piston 95, behind the plate 64, is a damper 91 that damps movement of the second piston 95.

The first piston 92 is moveable between two positions. A first position is an extended position where the front of the first piston head 93 abuts the valve seat 74a of the first disc 74 of the first pressure valve. In this position, the opening 75 in disc 74 is closed off and air from the first control pressure inlet 76 cannot reach the pressure chamber 72 of the first pressure valve 70 (shown in FIGS. 7a and 7e). This causes the first pressure valve 70 to close. A second position is a retracted position where the back of the first piston head 93 abuts against the slanted opening 79 of the second disc 78. In this position, the opening 75 in disc 74 is open and air from the first control pressure inlet 76 can reach the pressure chamber 72 of the first pressure valve 70 (shown in FIGS. 7b, 7c, 7d and 7f). This allows the first pressure valve 70 to open.

The second piston 95 is also moveable between two positions. A first position is an extended position where the needle piston head extends forwards past the piston head 93 of the first piston 92 and is located in the opening 75 of the first disc 74 of the first pressure valve. In this position air from the first control pressure inlet 76 is restricted in reaching the pressure chamber 72 of the first pressure valve 70. Gas flow is restricted through opening 75 by the second piston 95 in this first extended position even when the first piston head 93 is not abutting the valve seat 74a (shown in FIGS. 7d and 7e). A second position is a retracted position where the needle piston head of the second piston 95 is contained within the first piston 92. In this position, second piston 95 does not affect the control of air through the various openings (shown in FIGS. 7a, 7b, 7c and 7f).

Figure 7A:
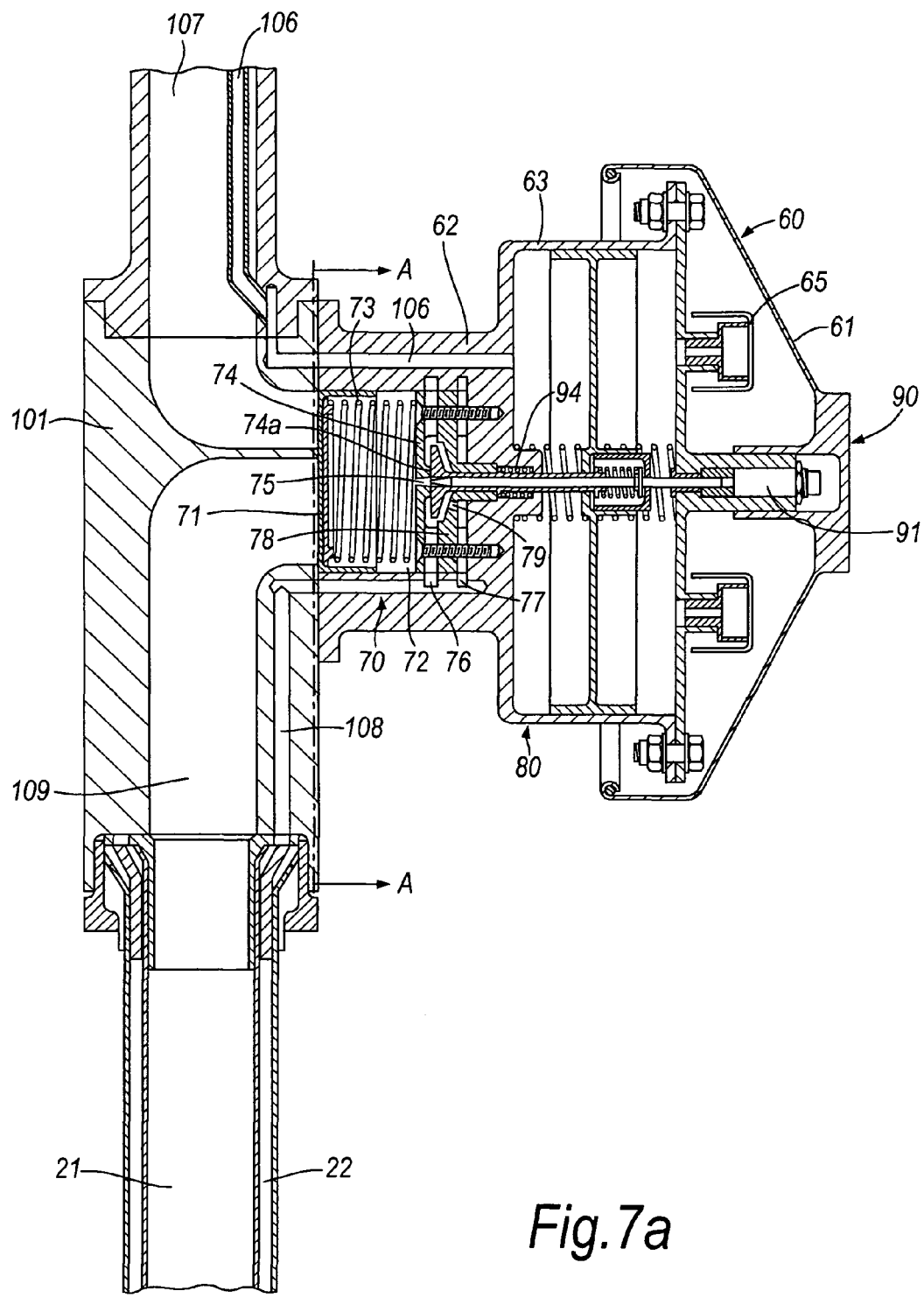
FIG. 7a shows a side section view of a meter valve assembly of the tank vent assembly of FIGS. 3a to 3e and 5.
Figure 8:
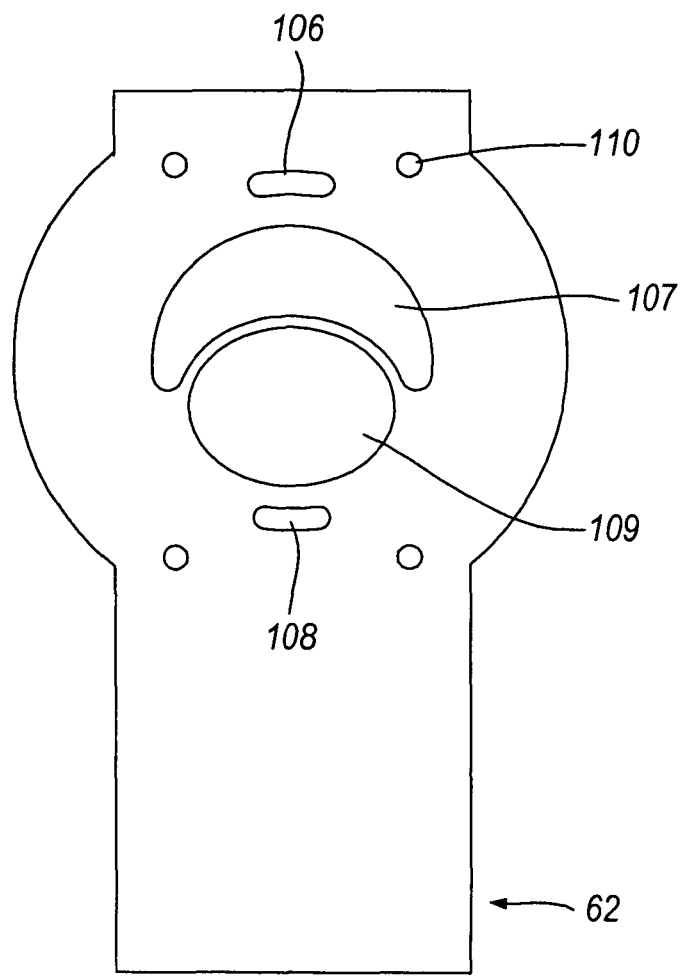

FIG. 8 shows a cross section A-A of part of FIG. 7a. The probe 100 has various channels for the outlet of the gas inlet bleed channel 106, gas inlet channel 107, control pressure input channel 108 and gas outlet channel 109 into the meter valve assembly 60. The shaft section 62 of the meter valve assembly 60 is attached to the probe by screws 110.

Figure 9A:
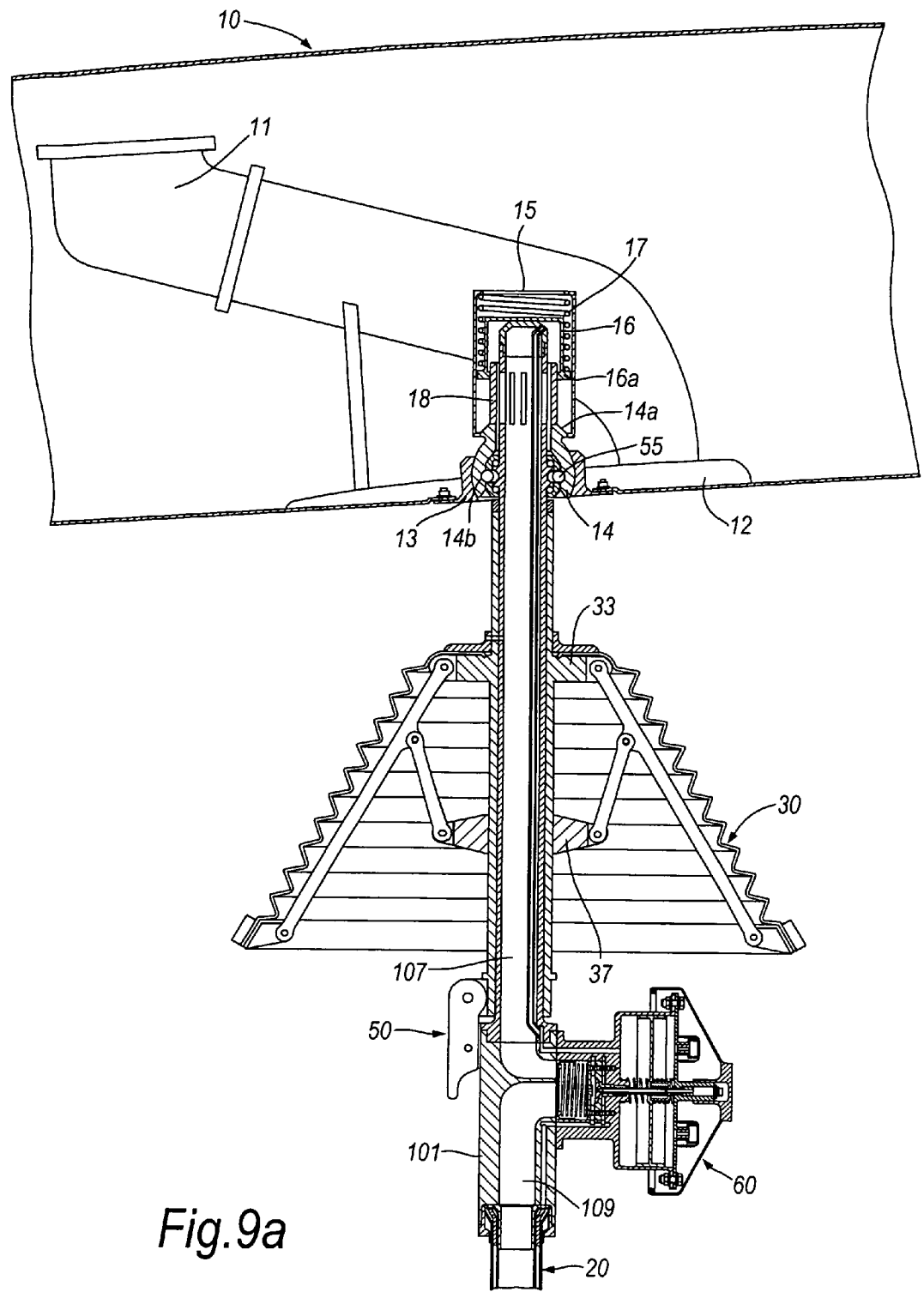
FIG. 9a shows a side section view of the tank vent assembly of FIGS. 3a to 3e and 5, shown in position in the valve assembly of the vent tank of FIGS. 1 and 2.
Figure 10:
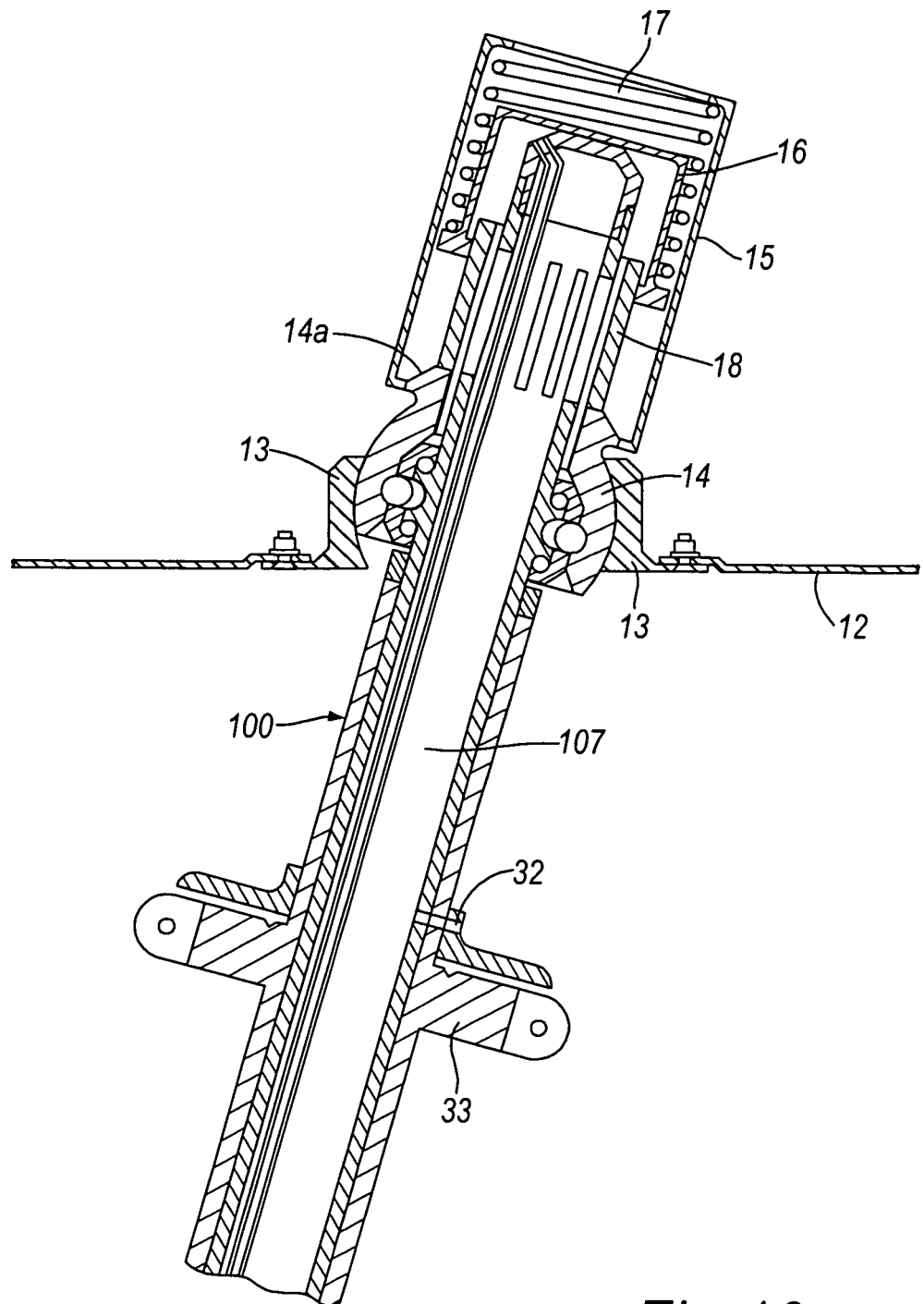
FIG. 10 shows an enlarged view of the tank vent assembly in the valve assembly.

In use, with reference to FIGS. 9a and 10, the cap 40 is lifted from the upper section 103 of the probe 100. The upper end of the probe 100 is inserted into the valve assembly of the vent tank 10. This causes the moveable cap 16 to lift upwards against the spring 17 and slide up the inner valve frame 18.

The ball race lever 51 is lifted from the lever retaining slot 53 and rotated by 15 to 30 degrees clockwise so as to rotate the lever collar 52. This rotates the ball race outer collar 54 so the ball bearings 55 rotate. The ball bearings 55 are then retained in the mini grooves on the top of the spokes of the inner collar 56 and therefore protrude further outwards into the circular groove 14b in the ball portion 14 of the gimble joint. This locks the probe 100 in place in the valve assembly and mechanically suspends it from the vent tank 10. The lever 51 can then be lowered and locked into place to prevent the probe from detaching. FIG. 9a shows the probe 100 locked in place in the valve assembly.

FIG. 10 shows that the probe 100 can be rotated by up to about 15 degrees with respect to the vent tank 10 due to the gimble joint formed by the ball portion 14 and socket 13 of the valve assembly on the vent tank 10. This reduces loads being applied to the tank or wing by the probe 100. The gimble joint 13, 14 is located as close to the underside skin structure as practical.

Figure 9B:
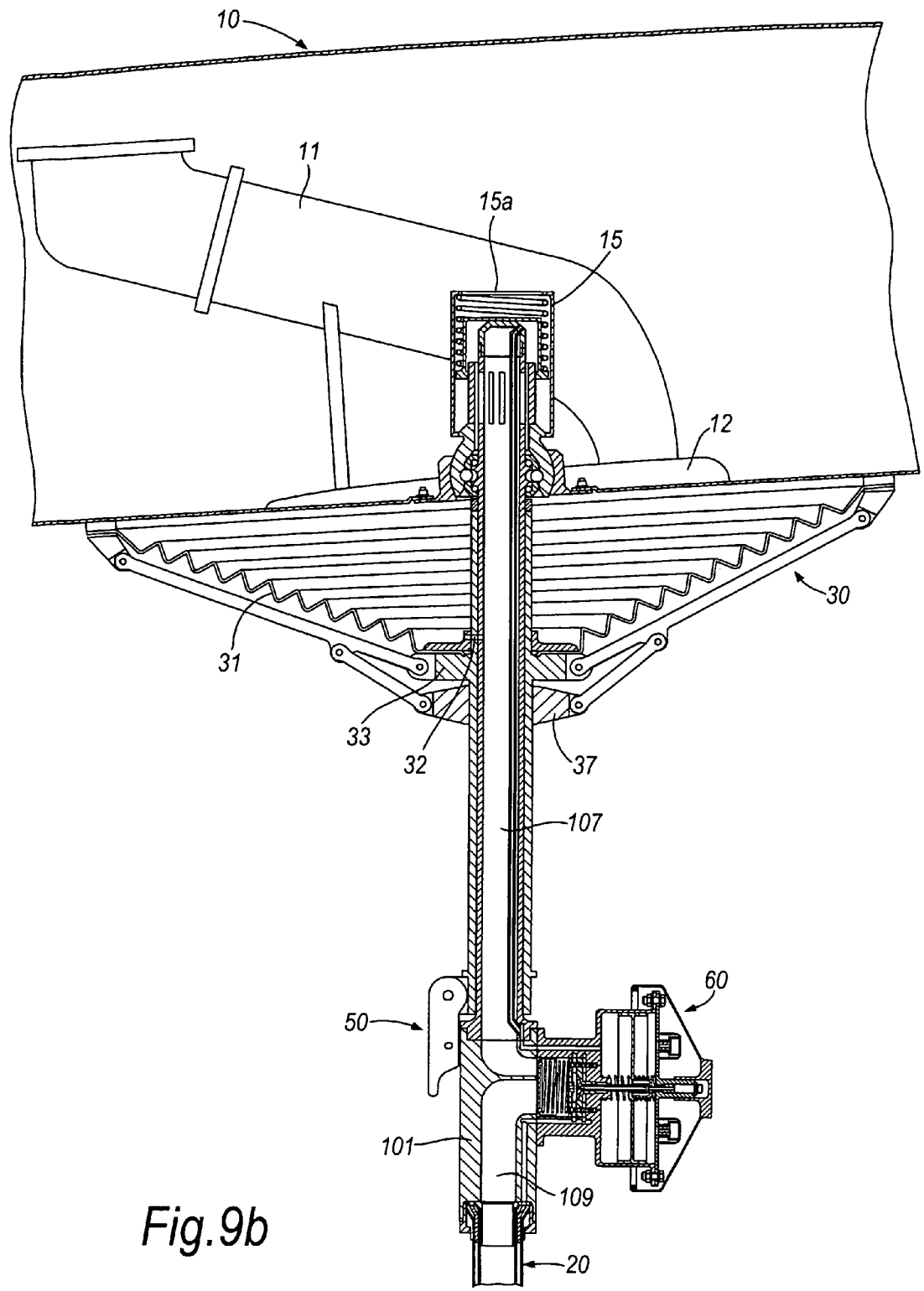
FIG. 9b shows another side section view of the tank vent assembly of FIGS. 3a to 3e and 5, shown in position in the valve assembly of the vent tank of FIGS. 1 and 2.

The umbrella shroud 30 can then be deployed into position (shown in FIG. 9b) by rotating handles 38a, 38b upwards (not shown in FIGS. 9a and 9b for clarity). This cause handle levers 36a, 36b to be pushed upwards. This, in turn pushes up handle lever slider 37 and connecting levers 35a, 35b. The connecting levers 35a, 35b push upwards on shroud levers 34a, 34b at the point of connection with the connecting levers. This causes the shroud levers 34a, 34b to rotate about the shroud connector 33 to deploy the shroud covering 31 against the underside of the vent tank 10 and covering the NACA duct 12 and flame arrestor 11 opening. The periphery of the shroud covering 31 forms an air tight seal against the tank 10 underside. The shroud 30 is designed to maintain small differential pressures but not to act as a restrictive barrier where high-pressure differentials are encountered. The umbrella shroud covering 31 captures any fuel vapour expelled from the flame arrestor 12 and these fuel vapours are drawn into the gas inlet channel 107 via bleed port 32 at the base of the umbrella shroud 30. The umbrella shroud 30 also acts to damp out movement of the probe by reacting small loads into the wing structure.

Once the probe 100 is inserted into the valve assembly, gas in the vent tank 10 can flow through the opening 15a in the valve outer casing 15 and into the gas inlet bleed channel 106 through the gas inlet bleed opening 105 and into the gas inlet channel 107 through the gas inlet slits 104. This is because the moveable cap 16 has been lifted by insertion of the probe 100 such that seat 16a lifts off seat 14a, allowing air to reach the gas inlet slits 19 on valve inner frame 18 and allow air up into the moveable cap 16.

Hence, in use, gas at the vent tank pressure is supplied to gas inlet channel 107 and gas inlet bleed channel 106.

In addition, a low pressure gas supply is supplied to the coaxial pipeline 20 in the inner 21 and outer 22 tubes. This low pressure is supplied from a vacuum device which is mounted to a refuel bowser or adjacent to a hydrant system. Typically, the low pressure supply is at 5 psi.

Referring again to FIGS. 7a to 7f, the different configurations of the meter valve assembly 60 in different operating conditions will be described.

FIG. 7a shows the meter valve assembly 60 in its default position before refuelling has started. The pressure chamber 81 is exposed to atmospheric pressure (approximately 15 psi) on both sides of the diaphragm 82. On the front side of the diaphragm 82, it is exposed to air at atmospheric pressure from the vent tank 10 through gas inlet bleed channel 106. The vent tank 10 experiences atmospheric pressure as it is exposed to atmospheric pressure via the NACA duct 12 and flame arrestor 11 prior to insertion of the probe 100. On the rear side of the diaphragm 82, it is exposed to air at atmospheric pressure from the outside through gas ports 65. Hence, the diaphragm 82 is in its central, default position. The first piston 92 is in its extended position with the piston head 93 of the first piston 92 abutting the seat 74a of disc 74 to close off opening 75. The first pressure valve 70 is in its closed position with the diaphragm 71 of the first pressure valve 70 abutting the dividing wall between the gas inlet channel 107 and gas outlet channel 109. The low pressure force on the diaphragm 71 of the first pressure valve 70 from the gas outlet channel 109 is not substantial.

As the first pressure valve 70 is closed, the low pressure supply (5 psi) in the gas outlet channel 109 does not reach the vent tank 10 through the gas inlet channel 107.

Figure 7B:
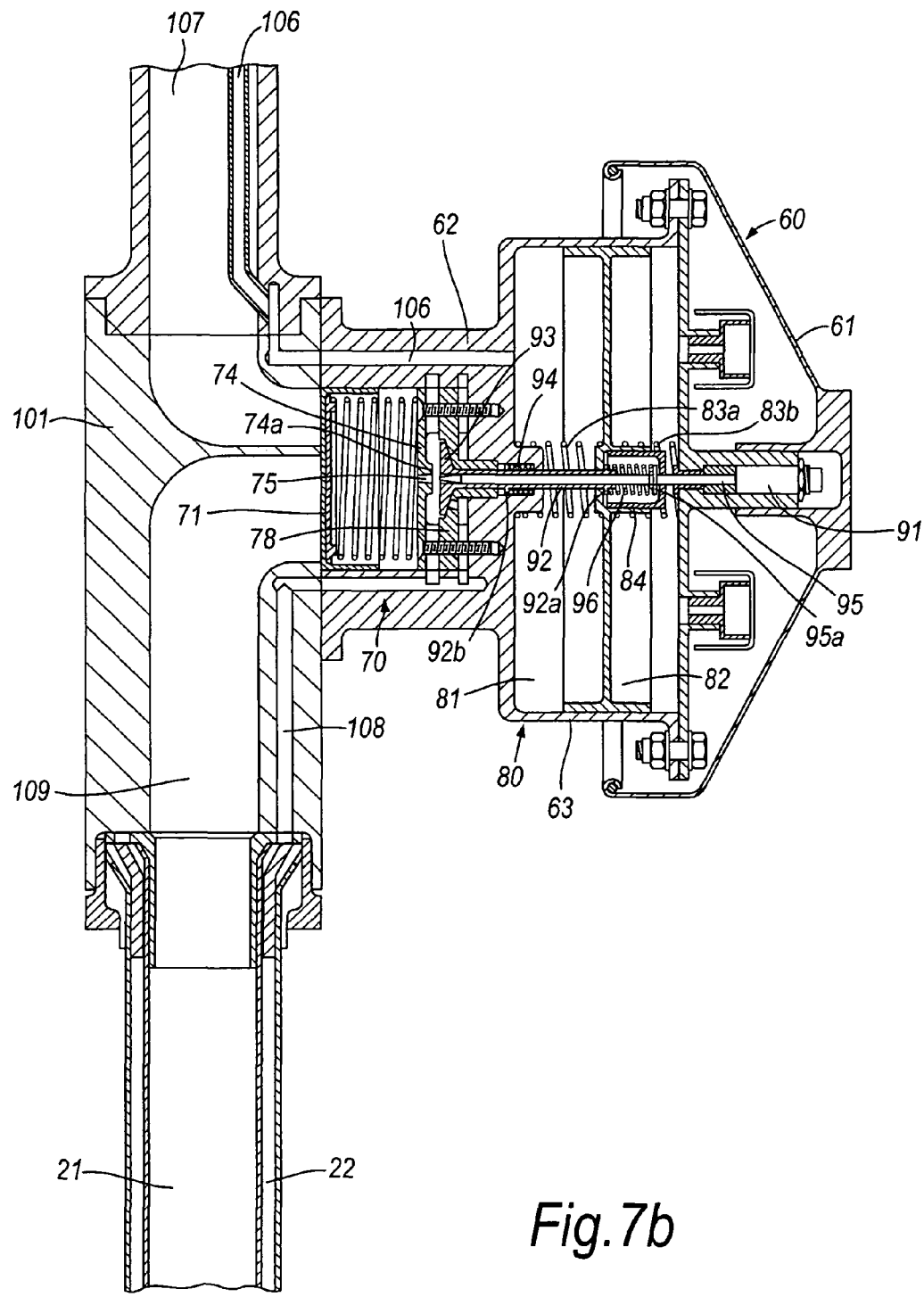
FIG. 7b shows a side section view of a meter valve assembly of the tank vent assembly of FIGS. 3a to 3e and 5.

In FIG. 7b, refuelling has started and the pressure in the vent tank 10 increases (to, say, 20 psi). This causes the pressure in gas inlet channel 107 and gas inlet bleed channel 106 to also increase (to 20 psi). The increase in pressure force on the diaphragm 71 of the first pressure valve 70 from the gas inlet channel 107 is not substantial because the area of the diaphragm 71 exposed to the gas inlet channel 107 is small compared to the area of the diaphragm 71 exposed to the gas outlet channel 109. However, the increased pressure in the gas inlet bleed channel 106 exposes the front side of the diaphragm 82 to air at a higher pressure (20 psi) than atmospheric pressure. The rear side of the diaphragm 82 is still exposed to air at atmospheric pressure (15 psi) from the outside through gas ports 65. Hence, the diaphragm 82 and box 84 are pushed backwards against spring 83. The box 84 pulls the stop 92a of the first piston 92 backwards, causing the first piston 92 to move backwards to its retracted position with the piston head 93 of the first piston 92 abutting the slanted opening 79 in second disc 78. This opens opening 75 in the first disc 74. Low pressure (5 psi) coming from control pressure input channel 108 and second control pressure inlet 77 holds the first piston head 93 against the second disc 78. However, the first pressure valve 70 remains closed so no fuel vapour can yet be drawn through the gas inlet channel 107 and gas outlet channel 109.

Figure 7C:
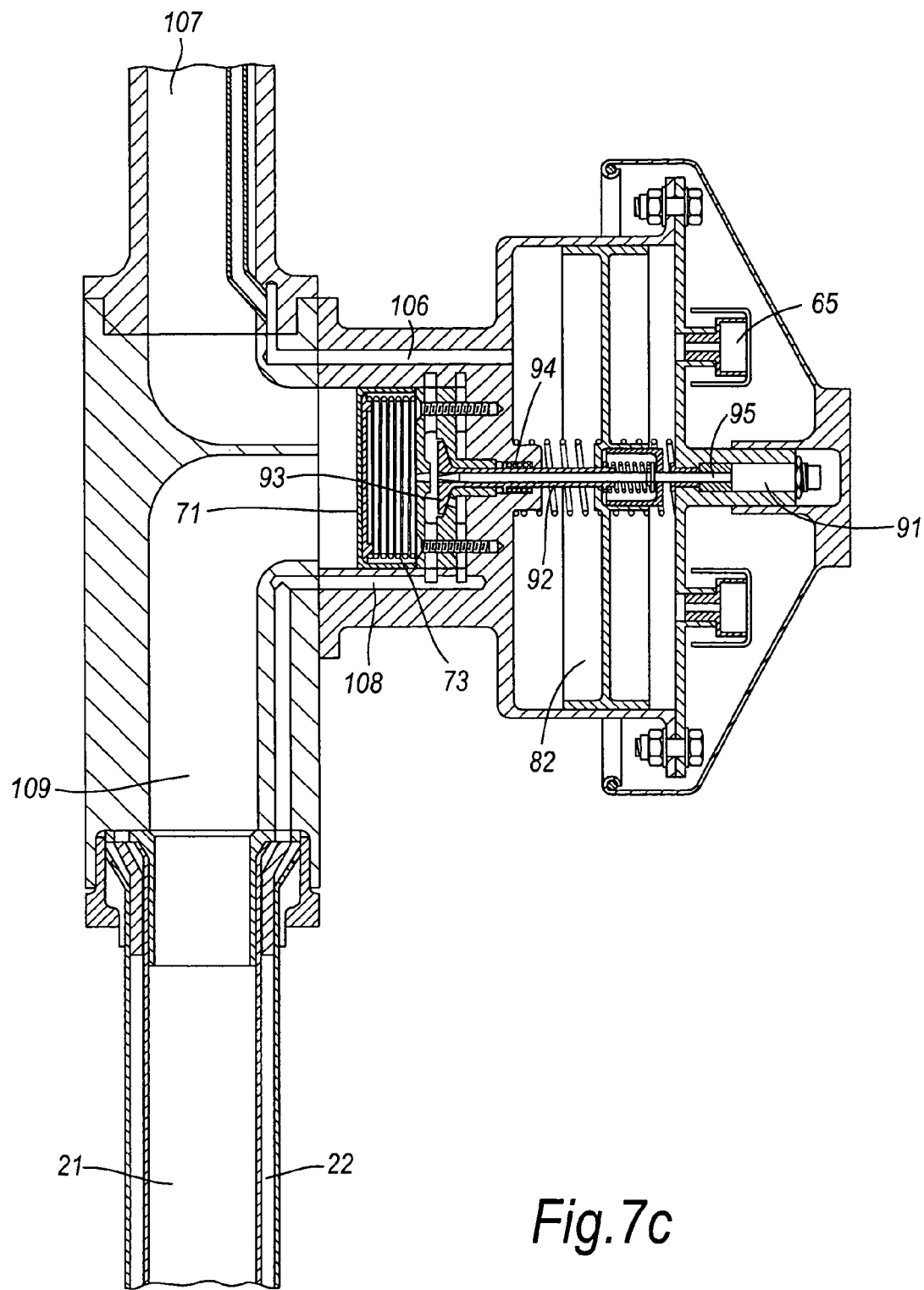
FIG. 7c shows a side section view of a meter valve assembly of the tank vent assembly of FIGS. 3a to 3e and 5.

In FIG. 7c, as the opening 75 in disc 74 is now open, suction pressure (5 psi) coming from control pressure input channel 108 is also applied through the first control pressure inlet 76 and opening 75 to the rear side of the diaphragm 71 of the first pressure valve 70. The entire rear side of the diaphragm 71 is exposed to the suction pressure (at 5 psi) from the control pressure input channel 108, whereas only part of the front side of the diaphragm 71 is exposed to the suction pressure (at 5 psi) from gas outlet channel 109. The gas outlet channel 109 is dimensioned such that the ratio of the area of the rear side of the diaphragm 71 to the area of the front side of the diaphragm exposed to the gas outlet channel 109 is greater than 1.75. This ensures that the suction force from the first control pressure inlet 76 on the rear of the diaphragm 71 is more than the suction force from the gas outlet channel 109 on the front of the diaphragm 71. Hence, this ensures that the diaphragm 71 moves away from the gas outlet channel 109, towards the first control pressure inlet 76. This causes the diaphragm 71 to move backwards against spring 73 away from the dividing wall between the gas inlet channel 107 and gas outlet channel 109 and open the first pressure valve 70.

As the first pressure valve 70 is open, the low pressure supply (at 5 psi) in the gas outlet channel 109 does reach the vent tank 10 through the gas inlet channel 107. Fuel vapour moves from the gas inlet channel 107 to the gas outlet channel 109, aided by the suction applied at the gas outlet channel 109.

Figure 7D:
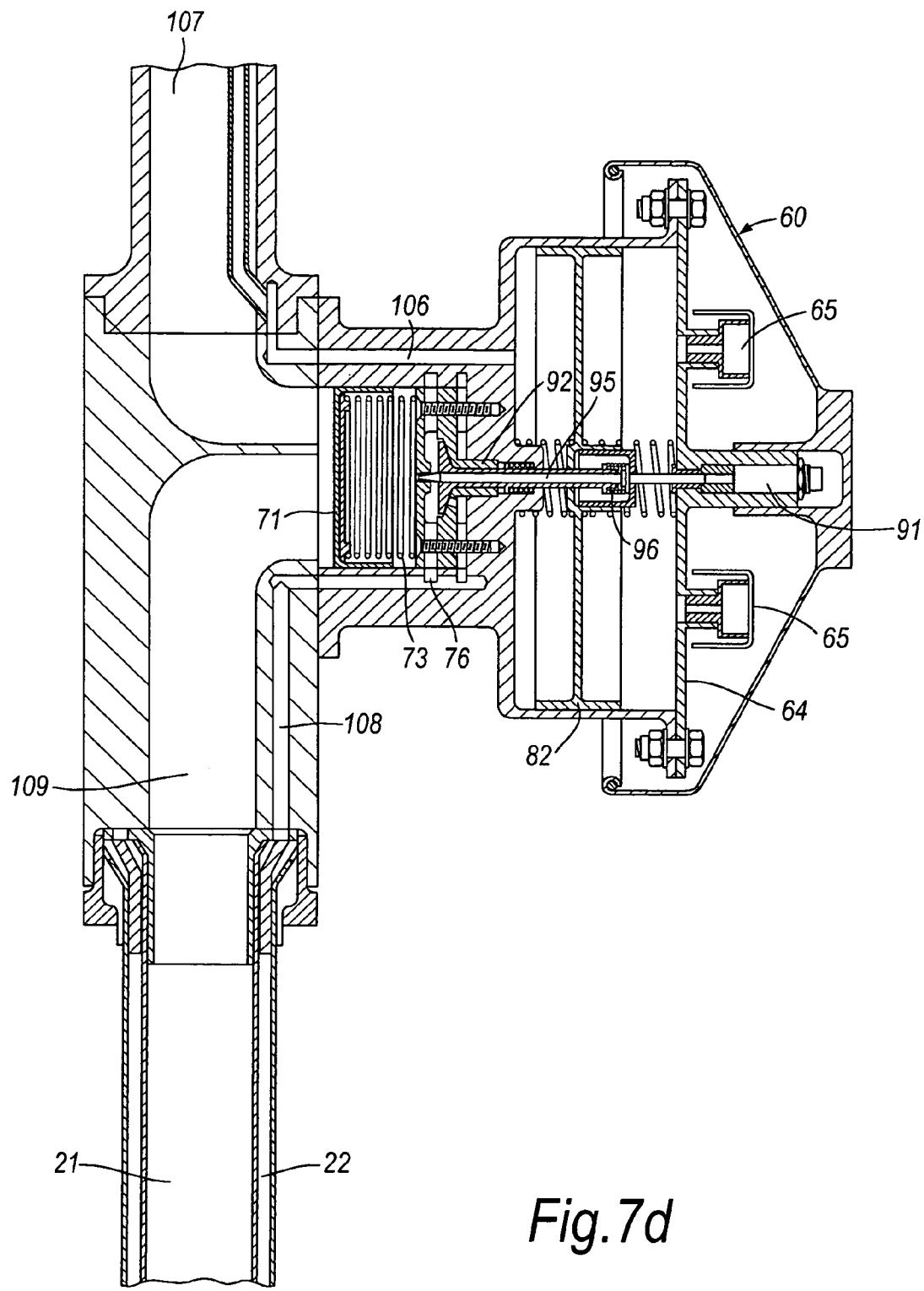
FIG. 7d shows a side section view of a meter valve assembly of the tank vent assembly of FIGS. 3a to 3e and 5.

In FIG. 7d, the pressure in the vent tank 10 has been reduced (to, say, 13 psi) by the application of low pressure (at 5 psi) to the gas inlet channel 107 through the now open first pressure valve 70. This causes the pressure in gas inlet channel 107 and gas inlet bleed channel 106 to also decrease (to approximately 13 psi). The decrease in pressure force on the diaphragm 71 of the first pressure valve 70 from the gas inlet channel 107 is not substantial. However, the decreased pressure in the gas inlet bleed channel 106 exposes the front side of the diaphragm 82 of the second pressure valve to air at a lower pressure (approximately 13 psi) than atmospheric pressure. The rear side of the diaphragm 82 is still exposed to air at atmospheric pressure from the outside through gas ports 65. Hence, the diaphragm 82 moves forwards against spring 83. The box 84 pushes the stop 95a of the second piston 95 forwards against spring 96, causing the second piston 95 to move forwards towards its extended position, extending outside of the first piston 92. This pushes the needle piston head of the second piston 95 into opening 75 in the first disc 74. Hence, this reduces the area that the suction pressure can flow through and consequently reduces the suction pressure force applied to the rear of the diaphragm 71 of the first pressure valve 70. This causes the diaphragm 71 to move back towards its closed position abutting the dividing wall of the gas inlet channel 107 and gas outlet channel 109. This restricts the low pressure supply from the gas outlet channel 109 to the gas inlet channel 107 and therefore restricts the low pressure supply to the vent tank 10.

Figure 7E:
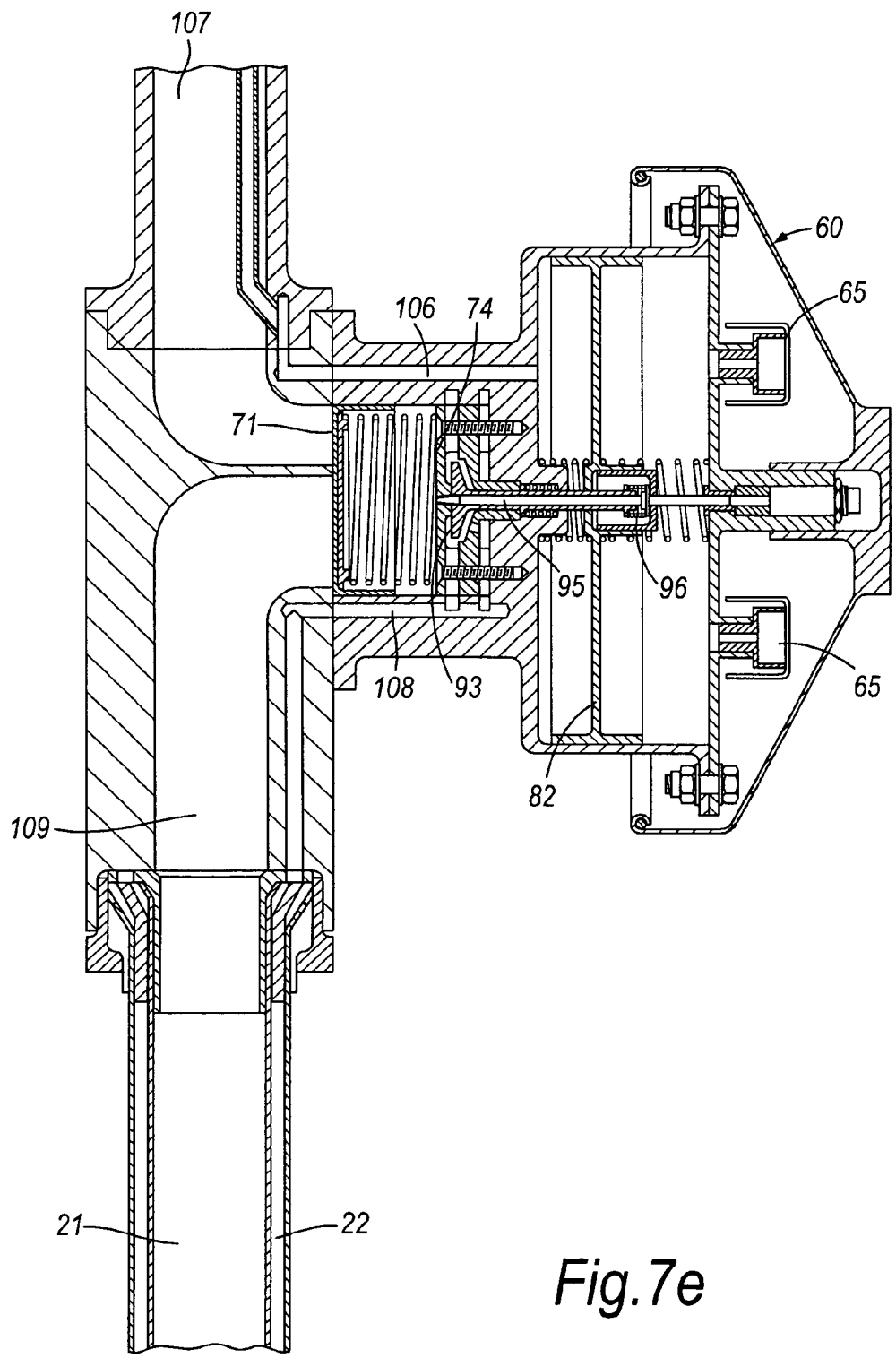
FIG. 7e shows a side section view of a meter valve assembly of the tank vent assembly of FIGS. 3a to 3e and 5.

In FIG. 7e, the pressure in the vent tank 10 has been reduced further by the continued application of low pressure to the gas inlet channel 107 through the open (albeit restricted) first pressure valve 70 (to, say, 12 psi). (In particular, the pressure in the vent tank 10 would reduce rapidly if refuel was no longer taking place or where refuel is reaching its end and the fuel tank is almost full so the corresponding ullage volume is very small.) This causes the pressure in gas inlet channel 107 and gas inlet bleed channel 106 to also further decrease. The further decrease in pressure force on the diaphragm 71 of the first pressure valve 70 from the gas inlet channel 107 is not substantial. However, the further decreased pressure in the gas inlet bleed channel 106 exposes the front side of the diaphragm 82 to air at an even lower pressure. The rear side of the diaphragm 82 is still exposed to air at atmospheric pressure (at 15 psi) from the outside through gas ports 65. Hence, the diaphragm 82 is moved further forwards against spring 83. The box 84 pushes the stop 95a of the second piston 95 further forwards against spring 96, causing the second piston 95 to move further forwards towards its extended position, extending outside of the first piston 92. This pushes the needle piston head of the second piston 95 to be inserted further into opening 75 in the first disc 74. Hence, this further reduces the suction pressure coming from the first control pressure inlet 76 and hence, reduces the low pressure applied to the rear of the diaphragm 71 of the first pressure valve 70. If the pressure at the front of the diaphragm 82 of the second pressure valve 80 is low enough, the box 84 pushes the stop 95a of the second piston 95 further forwards against spring 96, so as to completely compress spring 96 or so as to impart a sufficient force on the spring to unseat the first piston head 93. At this point, further movement of the box 84 forwards, causes the spring 96 to push on the stop 92a of the first piston 92, pushing the first piston 92 forwards so the first piston head 93 is unseated from the second disc 78. (This "unseat" force needed is equal to the sum of the suction pressure force applied by the ports of the second control pressure inlet 77. The suction pressure force for each port is the area of the port multiplied by the control pressure applied at the control pressure input channel 108.) The first piston head 93 is pushed forwards so as to abut the seat 74a of the first disc 74. This completely closes the opening 75 in the first disc 74 and therefore, shuts off suction pressure (at 5 psi) to the rear side of the diaphragm 71 of the first pressure valve 70 coming through first control pressure inlet 76 from control pressure input channel 108.

This causes the diaphragm 71 to move fully back towards its closed position abutting the dividing wall of the gas inlet channel 107 and gas outlet channel 109. This closes the low pressure supply from the gas outlet channel 109 to the gas inlet channel 107 and therefore stops the low pressure supply to the vent tank 10.

The opening and closing of the first pressure valve 70 and second pressure valve 80 continues to control supply of low pressure to the vent tank 10. The first 70 and second 80 pressure valves open and close based on the pressure in the vent tank 10, received from gas inlet bleed channel 106.

Hence, it can be seen that the embodiment of the invention described has an automatic mechanical arrangement that modulates low pressure supplied to the vent tank 10 and therefore protects the wing of the aircraft and the tanks of the aircraft from over or under pressure between the tank pressure and atmospheric pressure. This reduces and/or prevents damage to and strain on the tanks and wings and means that the weight of the wings and tanks does not need to be increased to cope with the venting of the tanks by the vent tank assembly. In addition, the aircraft can be refuelled quicker as the additional back pressure in the tank resulting from refuelling is reduced. The target level of pressure reduction in the vent tank is the same as the pressure increase due to refuel. In other words, the system acts to modulate the tank pressure to be the same or similar to atmospheric pressure and therefore to overcome the rise in pressure from the internal restrictions in the refuel and vent systems. The vent tank system is not intended to "pull" the fuel through the tank but to react to the increase in pressure.

In addition, the fuel vapour can be collected in a tank. The fuel vapour can simply be contained or it can be returned to liquid. The liquid fuel can either be used in power ground equipment, for example, at the airport, or re-processed for vehicle use. The containment tank used to contain the fuel vapour is fitted with a non-return valve (and could be filled with multiple non-return valves) to prevent a flame that may start in the containment tank from propagating into the vent tank 10 via the tank vent assembly.

Once refuel is completed, and the pressure in the tank 10 is stable, the low pressure supply can be shut-off, the umbrella shroud 30 can be collapsed and the ball race lock mechanism 50 can be unlocked by rotating the ball race lever 51 anti-clockwise. The probe 100 can then simply be removed from the valve assembly.

Figure 7F:
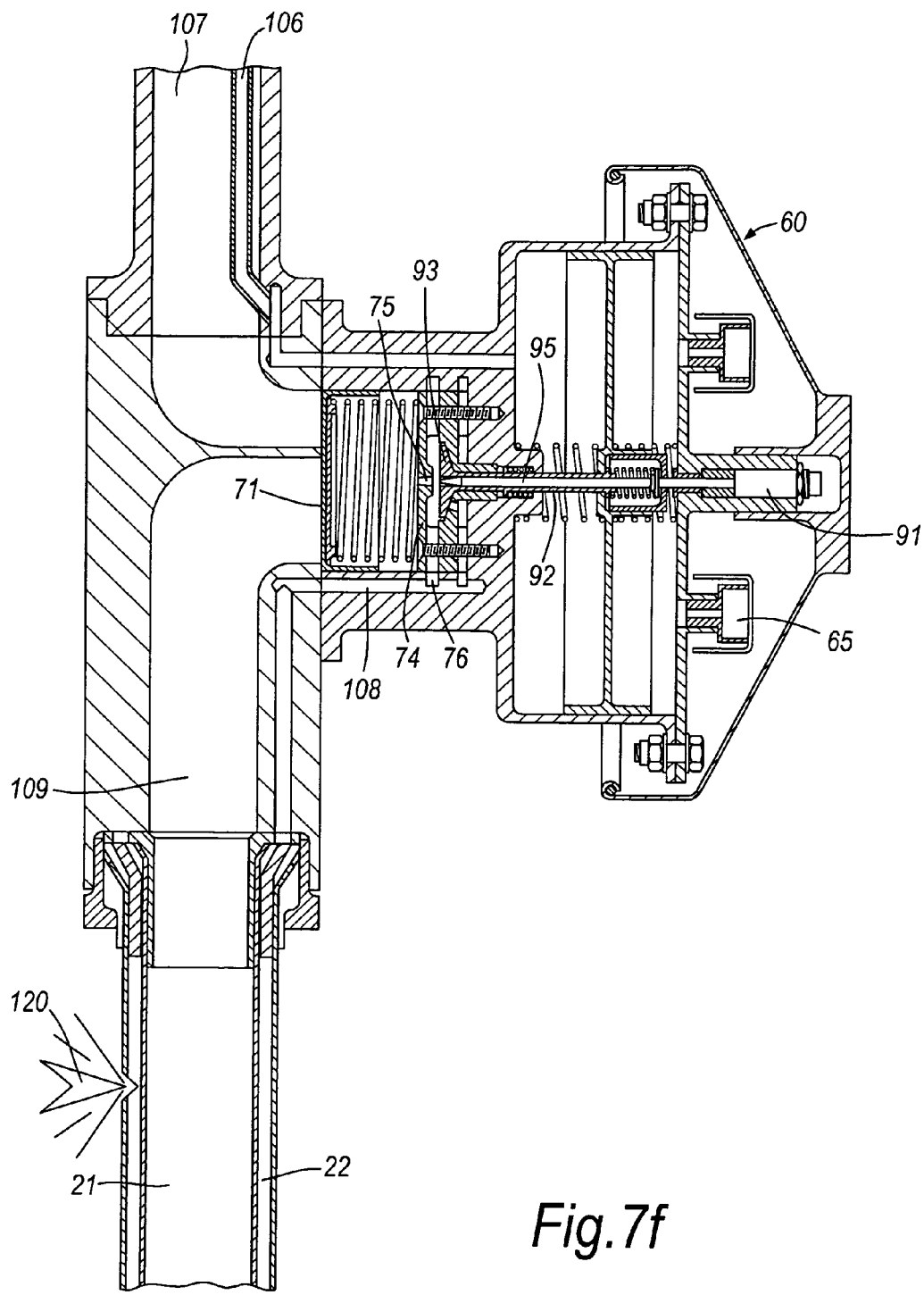
FIG. 7f shows a side section view of a meter valve assembly of the tank vent assembly of FIGS. 3a to 3e and 5.

In use, whilst the first pressure valve 70 is open and low pressure is applied to the gas inlet channel 107, the flame arrestor 12 is bypassed. FIG. 7f represents a situation where the outer tube 22 of the coaxial pipeline is damaged (for example, being severed or by a ground fire) at rupture point 120.

The rupture point 120 exposes the outer tube 22 of the coaxial pipeline 20 to atmospheric pressure. This means that atmospheric pressure is supplied to the control pressure input channel 108. Hence, atmospheric pressure is also supplied to the rear side of the diaphragm 71 of the first pressure valve 70 through first control pressure inlet 76 and opening 75 of the first disc 74. This causes the diaphragm 71 to move to its closed position abutting the dividing wall between the gas inlet channel 107 and gas outlet channel 109. This closes the first pressure valve 70 and shuts off the connection between the gas outlet channel 109 and gas inlet channel 107. This happens regardless of the position of the first piston 92, second piston 95 or diaphragm 82 of the second pressure valve 80. In other words, the first pressure valve 70 is closed off regardless of the vent tank 10 pressure.

Hence, it can be seen that the embodiment of the invention described has an automatic mechanical arrangement that means that the flame arrestor 11 is not bypassed in the event of damage to the pipeline 20. This means that in the event of a fire, a flame cannot bypass the flame arrestor 12 to propagate into the vent tank 10 though the vent tank assembly. It is advantageous that this automatic cut-off function is achieved by mechanical means without the need for electronics that would otherwise have to be incorporated in close proximity to the fuel vapour. This would further increase the risk of fire or explosion. In addition, electronic components may be more prone to failure. The operation of the embodiment described is totally dependent upon the flow of the air.

It is also impossible to breech the inner tube 21 of the hose without first cutting through the outer tube 22. Furthermore, the second pressure chamber 81 surrounds the first pressure chamber 72. Additionally, each time the device is used, this function, which is shared with the working function of the valve, is tested. If the function does not work, the device does not work in the first place.

In the above example a low pressure supply of 5 psi is used. However, the low pressure supplied at the gas outlet channel 109 and/or control pressure input channel 108 simply has to be at a lower pressure than atmospheric pressure. It does not have to produce a substantial suction pressure.

Figure 11:
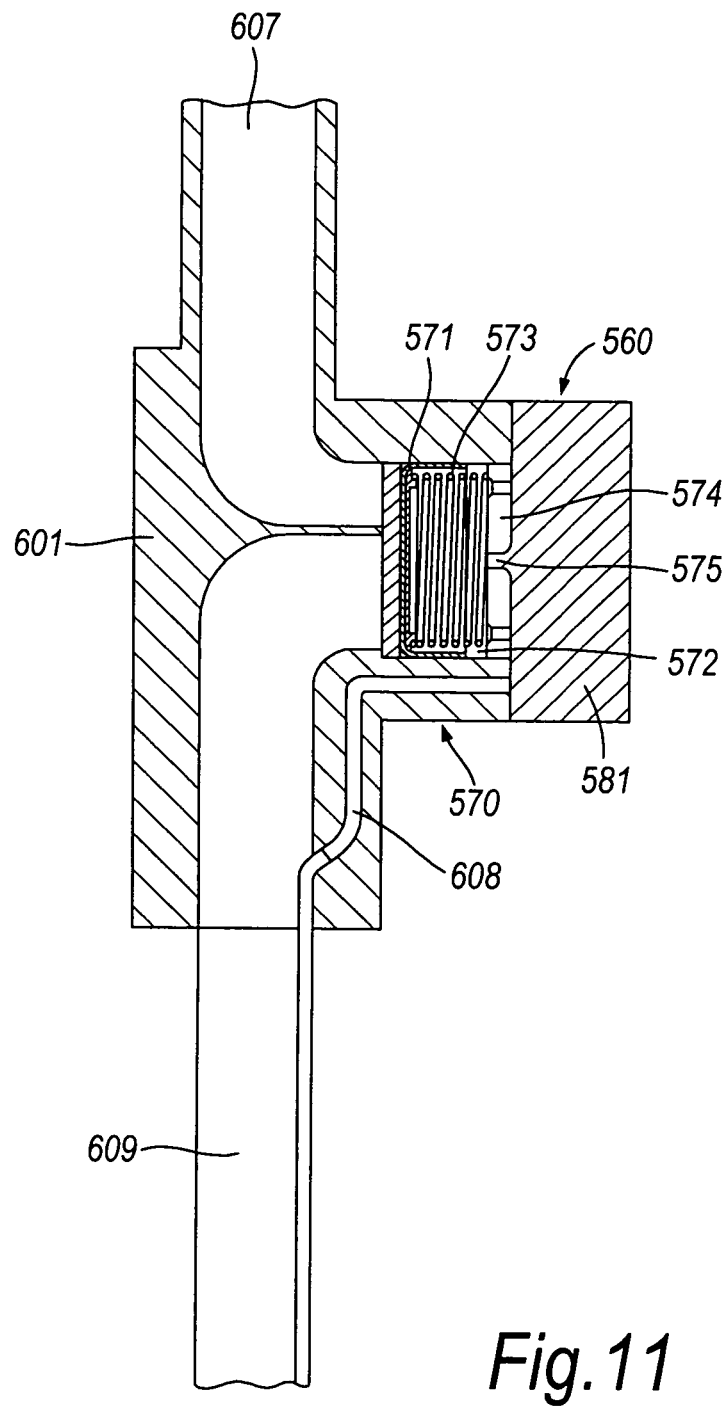
FIG. 11 shows a side section view of a meter valve assembly of a tank vent assembly according to a second embodiment of an aspect of the invention.

FIG. 11 shows a meter valve assembly of a tank vent device according to a second embodiment. In this figure and in the description below, reference numerals corresponding to similar features as in the first embodiment have been numbered to add 500 to the original numbering. I.e. feature 75 in the first embodiment is numbered as 575 in the second embodiment.

A pressure valve 570 is located in a shaft section of the meter valve assembly 560. The pressure valve 570 has a diaphragm 571 slidably moveable in a chamber 572 formed in the shaft section. A spring 573 is also contained in the chamber 572 between the rear of the diaphragm 571 and a disc 574 at the rear of the chamber 572. Hence, the diaphragm 571 is biased away from the disc 574. In its farthest position from the disc 574, the diaphragm 571 is in its closed position abutting against a dividing wall between a gas inlet channel 607 and a gas outlet channel 609.

The disc 574 has an opening 575 in the centre. A control pressure input channel 608 leads to a control pressure chamber 581 on the reverse side of the disc 574.

In use, gas at the vent tank pressure is supplied to gas inlet channel 607. In addition, a low pressure gas supply is supplied to the control pressure input channel 608.

In use, the diaphragm 571 is caused to move between an open position, allowing gas to flow from the gas inlet channel 607 to the gas outlet channel 609, and a closed position, abutting the dividing wall of the gas inlet channel 107 and gas outlet channel 109. This closes the low pressure supply from the gas outlet channel 609 to the gas inlet channel 607 and therefore stops the low pressure supply to the vent tank 510 (not shown).

The opening and closing of the pressure valve 570 controls supply of low pressure to the vent tank 510. The pressure valve 570 opens and closes based on the force provided by the control pressure in the control pressure chamber 581, coming from the control pressure input channel 608.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

For example, the tank that the fuel vapour is vented from may not be a vent tank. Instead, fuel vapour may be vented from the aircraft (or other vehicle) straight from the fuel tank itself. Hence, in the context of the present invention, the term "vent tank" is used to describe any tank that gas can be vented from, including a specific tank that gas first vents to from a separate fuel tank.

As an alternative, the supplies at the gas outlet channel 109 and control pressure input channel 108 could be different and independent. This would likely require further safety features.

As another alternative, instead of, or in addition to, the second piston 95 moving forwards when the diaphragm 82 moves forwards to reduce the area that suction pressure can flow through, the needle piston head could open an air port that connects the chamber to ambient air thus reducing the effect of the control pressure.

As another alternative, the valve assembly may be manufactured and designed as part of the NACA duct. As another alternative, the valve assembly may be retro-fitted to an aircraft as part of the existing NACA duct.

As an alternative use, the vent tank assembly may be used to vent gas from a automotive vehicle or any other type of vehicle or equipment with a fuel tank that requires venting.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of venting gas from a tank, wherein the method includes the steps of:
    providing a tank vent assembly including:
        a gas inlet for receiving gas from a vent outlet of a tank;
        a gas outlet for discharging the gas received from a vent outlet of the tank;
        a pressure valve connecting the gas inlet and gas outlet, wherein the pressure valve is connected to a control pressure input and is controllable by control pressure supplied at the control pressure input, and
        a coaxial pipeline connected to the gas outlet of the tank vent device, wherein the coaxial pipeline is configured to be connected to a low pressure and control pressure supply;
    connecting the tank vent assembly to a vent tank, and
    venting gas from the vent tank through the gas inlet and gas outlet of the tank vent assembly.

2. A method of refuelling an aircraft, including the method of venting gas from a tank on the aircraft according to claim 1 and simultaneously supplying liquid fuel to a fuel tank on the aircraft.

3. A method to vent gas from a tank, the method comprising:
    providing a pressure valve to control the venting of gas from the tank, and
    providing a control pressure to control opening and closing of the pressure valve wherein said control pressure is independent of pressure in said tank, and
    changing an area over which the control pressure is supplied to the pressure valve so as to vary the pressure force on the pressure valve.

4. A method as claimed in claim 3, wherein the control pressure is lower than the pressure of the tank.

5. A method as claimed in claim 3, wherein the area is changed based on a pressure differential between the pressure of the tank and a base pressure.

6. A method as claimed in claim 3, wherein the method includes the step of providing a low pressure supply to an output of the pressure valve.

7. A method of venting gas from a tank comprising:
    providing a tank vent device, wherein the tank vent device includes;
        a gas inlet for receiving gas from a vent outlet of the tank,
        a gas outlet for discharging the gas received from the vent outlet of the tank, and
        a pressure valve connecting the gas inlet and gas outlet, wherein the pressure valve is connected to a control pressure input and is controllable by control pressure supplied at the control pressure input, and the pressure valve is controlled by the control pressure to open and close so as to regulate the flow of gas between the gas inlet and the gas outlet, wherein the device further comprises a second pressure valve for controlling the pressure force supplied to the first pressure valve by the control pressure;
    connecting the device to a vent tank, and
    venting gas from the vent tank through the gas inlet and gas outlet of the device.

8. A method of venting gas from a tank comprising:
    providing a tank vent device including:

a gas inlet for receiving gas from a vent outlet of the tank,
a gas outlet for discharging the gas received from the vent outlet of the tank, and
a pressure valve connecting the gas inlet and gas outlet, wherein the pressure valve is connected to a control pressure input and is controllable by control pressure supplied at the control pressure input and the pressure valve is controlled by the control pressure to open and close so as to regulate the flow of gas between the gas inlet and the gas outlet, wherein the device is arranged to receive a coaxial pipeline such that the gas outlet can be connected to an inner section of the coaxial pipeline and that the control pressure can be supplied in an outer section of the coaxial pipeline, such that, in use, when the outer section of the coaxial pipeline is cut or severed, atmospheric pressure is supplied as the control pressure, causing the first pressure valve to close;
connecting the device to a vent tank, and
venting gas from the vent tank through the gas inlet and gas outlet of the device.

9. A method of venting gas from a tank comprising:
providing a tank vent device including:
a gas outlet for discharging the gas received from the vent outlet of the tank, and
a pressure valve connecting the gas inlet and gas outlet, wherein the pressure valve is connected to a control pressure input and is controllable by control pressure supplied at the control pressure input and the pressure valve is controlled by the control pressure to open and close so as to regulate the flow of gas between the gas inlet and the gas outlet, wherein the device further comprises a probe for connecting to a vent tank, the probe comprising a nozzle connected to the gas inlet such that gas can be vented from the tank, through the nozzle to the gas inlet;
connecting the device to a vent tank, and
venting gas from the vent tank through the gas inlet and gas outlet of the device.

10. A tank vent assembly comprising;
a gas inlet for receiving gas from a vent outlet of a tank;
a gas outlet for discharging the gas received from a vent outlet of the tank;
a pressure valve connecting the gas inlet and gas outlet, wherein the pressure valve is connected to a control pressure input and is controllable by control pressure supplied at the control pressure input, and
a coaxial pipeline connected to the gas outlet, wherein the coaxial pipeline is configured to be connected to a low pressure and control pressure supply.

11. A tank vent device for venting gas from a tank, the device comprising;
a gas inlet for receiving gas from a vent outlet of the tank,
a gas outlet for discharging the gas received from the vent outlet of the tank, and
a pressure valve connecting the gas inlet and gas outlet, wherein the pressure valve is connected to a control pressure input and is controllable by control pressure supplied at the control pressure input and the pressure valve is controlled by the control pressure to open and close so as to regulate the flow of gas between the gas inlet and the gas outlet, wherein the device is arranged to receive a coaxial pipeline such that the gas outlet can be connected to an inner section of the coaxial pipeline and that the control pressure can be supplied in an outer section of the coaxial pipeline, such that, in use, when the outer section of the coaxial pipeline is cut or severed, atmospheric pressure is supplied as the control pressure, causing the first pressure valve to close.

12. A tank vent assembly comprising;
the tank vent device of claim 11, and
a coaxial pipeline connected to the gas outlet of the tank vent device for connection to a low pressure and control pressure supply.

13. A tank vent device for venting gas from a tank, the device comprising;
a gas inlet for receiving gas from a vent outlet of the tank,
a gas outlet for discharging the gas received from the vent outlet of the tank, and
a pressure valve connecting the gas inlet and gas outlet, wherein the pressure valve is connected to a control pressure input and is controllable by control pressure supplied at the control pressure input and the pressure valve is controlled by the control pressure to open and close so as to regulate the flow of gas between the gas inlet and the gas outlet, wherein the device further comprises a probe for connecting to a vent tank, the probe comprising a nozzle connected to the gas inlet such that gas can be vented from the tank, through the nozzle to the gas inlet.

14. A tank vent device as claimed in claim 13, wherein the probe further comprises a locking mechanism for securing the probe to the tank during use.

15. A tank vent assembly comprising;
the tank vent device of claim 13, and
a coaxial pipeline connected to the gas outlet of the tank vent device for connection to a low pressure and control pressure supply.

16. A tank vent device as claimed in claim 13, wherein a shroud is mounted on the probe, such that, in use, the shroud provides a seal around the probe and wherein the shroud can be moved between a deployed position, wherein, in use, the shroud provides a seal around the probe, and a collapsed position, such that the device can be stored.

17. A tank vent device as claimed in claim 16, wherein the shroud comprises a lever mechanism, such that, when in the deployed position, the levers are over-centred so as to help maintain the shroud in the deployed position.

18. A vent tank comprising a valve assembly for connecting to the vent tank device of claim 13, the valve assembly comprising;
a valve such that when the probe is inserted in the valve assembly, the valve can be opened to allow gas in the vent tank to vent into the probe, and
a securing mechanism for releasably securing the probe to the vent tank.

19. A vent tank as claimed in claim 18, wherein the valve assembly further comprises a rotatable joint to allow the probe to move rotationally in relation to the tank.

20. An aircraft wing comprising the vent tank of claim 18.

21. An aircraft comprising the vent tank of claim 18.

22. A tank vent device for venting gas from a tank, the device comprising;
a gas inlet for receiving gas from a vent outlet of the tank,
a gas outlet for discharging the gas received from the vent outlet of the tank, and
a pressure valve connecting the gas inlet and gas outlet, wherein the pressure valve is connected to a control pressure input and is controllable by control pressure supplied at the control pressure input, and the pressure valve is controlled by the control pressure to open and close so as to regulate the flow of gas between the gas inlet and the gas outlet, wherein the device further comprises a second pressure valve for controlling the pressure force supplied to the first pressure valve by the control pressure.

23. A tank vent device as claimed in claim 22, wherein, in use, the second pressure valve controls the pressure force supplied to the first pressure valve by controlling the area over which the control pressure is supplied to the first pressure valve.

24. A tank vent assembly comprising;
the tank vent device of claim 22, and
a coaxial pipeline connected to the gas outlet of the tank vent device for connection to a low pressure and control pressure supply.

25. A tank vent device as in any of claims 22, 11 and 13 whereby the pressure valve is configured to be controlled by the control pressure to open and close so as to regulate the flow of gas between the gas inlet and the gas outlet, wherein the gas inlet and gas outlet both act on a first side of a moveable diaphragm of the pressure valve and wherein the control pressure input acts on a second, opposite side of the diaphragm.

26. A tank vent device as claimed in claim 25, wherein the cross-sectional area of the gas inlet and the cross-sectional area of the gas outlet acting on the diaphragm of the first pressure valve are dimensioned such that, in use, when the gas inlet experiences a higher than atmospheric pressure from the tank and the gas outlet experiences a lower than atmospheric pressure from a low pressure supply, there is little overall pressure force acting on the diaphragm from the combination of the gas inlet and gas outlet.

27. A tank vent device as claimed in claim 22, wherein the second pressure valve is controllable based on a pressure differential between two pressure inputs including a first pressure input corresponding to the pressure in the tank being vented.

28. A tank vent device as claimed in claim 27, wherein a second pressure input to the second pressure valve corresponds to a base pressure.

29. A tank vent device as claimed in claim 27, wherein the second pressure valve comprises a moveable diaphragm, with the first pressure input on one side of the diaphragm and a second pressure input on the second, opposite side of the diaphragm.

30. A tank vent device as claimed in claim 29, wherein the diaphragm of the second pressure valve is connected to a piston, such that when the diaphragm moves in a first direction towards the second pressure input side, the piston is caused to move in the same direction, from a closed position against a first seat to an open position.

31. A tank vent device as claimed in claim 30, wherein the first seat is on the second, opposite side of the first pressure valve, such that lifting of the piston from the first seat opens the control pressure input of the first pressure valve, enabling a pressure force to be supplied to the first pressure valve by the control pressure.

32. A tank vent device as claimed in claim 30, wherein the diaphragm of the second pressure valve is also connected to a second piston, such that when the diaphragm moves in a second direction towards the first pressure input side, the second piston is caused to move in the second direction, thereby urging the second piston towards a restricting position with respect to the control pressure input of the first pressure valve.

33. A tank vent device as claimed in claim 32, wherein once the second piston is in its restricting position, further movement of the diaphragm in the second direction causes the first piston to move in the second direction towards its closed position against the first seat to seal off the control pressure input of the first pressure valve.

* * * * *